(12) United States Patent
Takaishi et al.

(10) Patent No.: US 7,508,620 B2  
(45) Date of Patent: *Mar. 24, 2009

(54) DISK APPARATUS, INFORMATION PROCESSING SYSTEM, AND INFORMATION PROVIDING APPARATUS

(75) Inventors: Kazuhiko Takaishi, Kawasaki (JP); Tomoyoshi Yamada, Kawasaki (JP); Masanori Fukushi, Kawasaki (JP); Tsugito Maruyama, Kawasaki (JP); Hiroyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 174 days.

This patent is subject to a terminal disclaimer.

(21) Appl. No.: 11/474,837

(22) Filed: Jun. 26, 2006

(65) Prior Publication Data

US 2007/0206304 A1 Sep. 6, 2007

(30) Foreign Application Priority Data

Mar. 2, 2006 (JP) ............................. 2006-056851

(51) Int. Cl.
*G11B 5/596* (2006.01)

(52) U.S. Cl. ...................................... 360/77.04; 360/15

(58) Field of Classification Search ...................... None
See application file for complete search history.

(56) References Cited

U.S. PATENT DOCUMENTS 5,936,790 A * 8/1999 Ho et al. .................. 360/77.05
6,166,875 A  12/2000 Ueno et al.
7,312,939 B2 * 12/2007 Bandic et al. ................. 360/15

FOREIGN PATENT DOCUMENTS

| JP | 11-126444 | 5/1999 |
| JP | 2004-342316 | 12/2004 |
| JP | 2005122840 A * | 5/2005 |

* cited by examiner

*Primary Examiner*—Jason C Olson
(74) *Attorney, Agent, or Firm*—Greer, Burns & Crain, Ltd.

(57) ABSTRACT

A storing unit stores first correction information for correcting a distortion synchronized with a rotation frequency of servo information of a first disk. A control unit controls positioning of a head on a target track by correcting the servo information of the first disk with the first correction information. Measurement information used for measuring the first correction information is calculated based on second correction information for the servo information in other disk apparatus including a second disk on which the servo information is formed using a common master medium with the first disk.

30 Claims, 16 Drawing Sheets

FIG.11

| TRACK NUMBER | APPARATUS No.1 | APPARATUS No.2 | ... | APPARATUS No.n | AVERAGE |
|---|---|---|---|---|---|
|  |  |  |  |  |  |
| 0 |  |  |  |  |  |
| 1 |  |  |  |  |  |
| 2 |  |  |  |  |  |
| 3 |  |  |  |  |  |
| 4 |  |  |  |  |  |
|  |  |  |  |  |  |
| 49995 |  |  |  |  |  |
| 49996 |  |  |  |  |  |
| 49997 |  |  |  |  |  |
| 49998 |  |  |  |  |  |
| 49999 |  |  |  |  |  |
| 50000 |  |  |  |  |  |

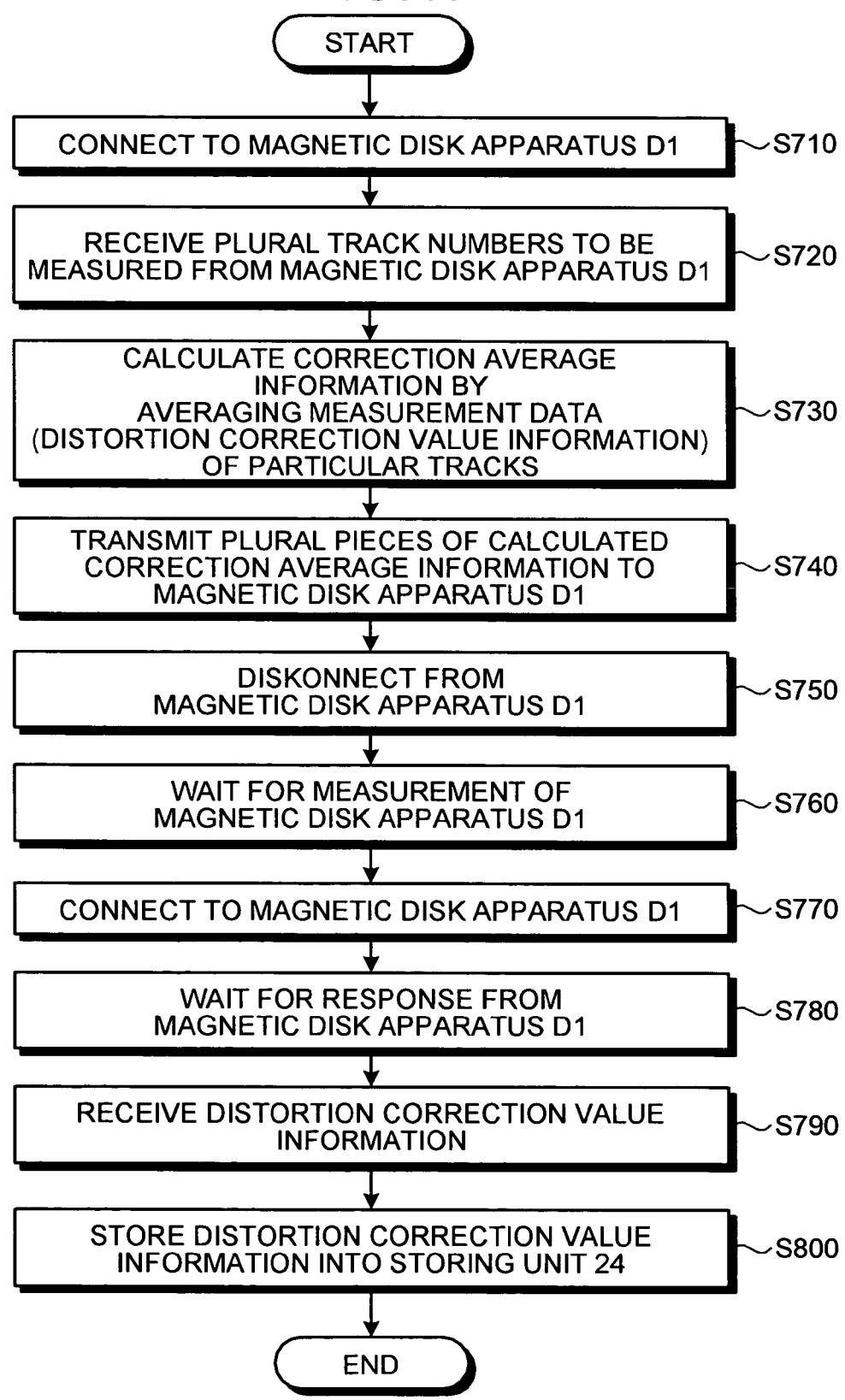

DISK APPARATUS, INFORMATION PROCESSING SYSTEM, AND INFORMATION PROVIDING APPARATUS

BACKGROUND OF THE PRESENT INVENTION

1. Field of the Present Invention

The present invention relates to a technology for correcting distortion of servo information generated using a common master medium.

2. Description of the Related Art

Conventionally, there has been a demand for an increase in the storage capacities of disk apparatuses like magnetic disk apparatuses. To increase the storage capacity of a magnetic disk apparatus, it is necessary to make the track pitch of a magnetic disk small and to write servo information at correct positions accurately. One of the methods that are used to write servo information at correct positions accurately is to give individual magnetic disk apparatuses a function to write the servo information at the correct positions accurately; however, this method makes the price of each magnetic disk apparatus high.

For this reason, another method in which after servo information is written onto a magnetic disk, the magnetic disk having the servo tracks written is installed in each apparatus has been considered. In such a magnetic disk apparatus, it is extremely important to determine the position of the head accurately on the target track for improvement of the recording density of the magnetic disk. The information used to control the determination of the position with respect to the target track is recorded on the magnetic disk medium and is called servo signals. The processing of recording the servo signals for the magnetic recording apparatus is called "servo track write (STW)". Various methods of STW have been proposed.

An example of STW method is to form servo information, using a common master medium for magnetic transfer, discrete track, and patterned media, and the like. When this method is used, the servo information is generated on each of the magnetic disks by manufacturing a large number of duplicated magnetic disks from the mold in common. In this situation, a problem arises where a distortion in the mold makes the determination of the position with respect to the target track inaccurate. Thus, it is necessary to determine the position with respect to the target track, after the deviation of the track position due to a distortion in the mold or the like is corrected.

Methods for controlling the determination of the position of the head by correcting the deviation in the position of the track due to a distortion in the mold or the like includes a method in which the deviation in the position of the track is followed and another method in which a virtual track is generated so that the deviation in the position of the track is not followed, but the virtual track is followed. Various proposals have been made as to which one of these methods should be used.

For example, Japanese Patent Application Laid-open No. 2004-342316 discloses a magnetic disk with which a control unit that controls the determination of the position according to a position error of the magnetic head based on the servo information performs a feed-forward control on the position determination process by following the measured rotation frequency component of the magnetic disk and eliminating a high-order frequency component that has a higher frequency than the rotation frequency.

With the above technology, to correct distortion information on the disk (the servo information) caused by the mold or the like, the rotation frequency component of the magnetic disk and the high-order frequency component that has a higher frequency than the rotation frequency are measured for each magnetic disk apparatus. Thus, a problem arises where it takes a long period of time to correct the distortion information for the magnetic disk apparatus. Because of the problem, it takes a long period of time to manufacture each magnetic disk apparatus, and the level of productivity is lowered. The higher the recording density of each magnetic disk apparatus becomes, the bigger the influence of these problems is.

SUMMARY OF THE PRESENT INVENTION

It is an object of the present invention to at least partially solve the problems in the conventional technology.

A disk apparatus according to one aspect of the present invention, which has a first disk on which servo information is formed, includes a storing unit that stores first correction information for correcting a distortion synchronized with a rotation frequency of the servo information, the first correction information being measured based on the servo information of the first disk; and a control unit that controls positioning of a head on a target track by correcting the servo information of the first disk with the first correction information stored in the storing unit. Measurement information that is used for measuring the first correction information is calculated based on second correction information for correcting a distortion synchronized with the rotation frequency of the servo information in other disk apparatus including a second disk on which the servo information is formed using a common master medium with the first disk.

An information processing system according to another aspect of the present invention includes a disk apparatus having a first disk on which servo information is formed. The disk apparatus includes a storing unit that stores first correction information for correcting a distortion synchronized with a rotation frequency of the servo information, the first correction information being measured based on the servo information of the first disk; and a control unit that controls positioning of a head on a target track by correcting the servo information of the first disk with the first correction information stored in the storing unit. Measurement information that is used for measuring the first correction information is calculated based on second correction information for correcting a distortion synchronized with the rotation frequency of the servo information in other disk apparatus including a second disk on which the servo information is formed using a common master medium with the first disk.

An information providing apparatus according to still another aspect of the present invention includes a storing unit that stores information for correcting a distortion synchronized with a rotation frequency of servo information in a second disk apparatus including a second disk on which the servo information is formed, as second correction information; and a transmitting unit that transmits, when a first disk apparatus including a first disk on which the servo information is formed using a common master medium with the second disk measures information for correcting a distortion synchronized with the rotation frequency of the servo information, as first correction information, information calculated based on the second correction information to the first disk apparatus as measurement information.

A disk-apparatus correcting system according to still another aspect of the present invention causes a first disk apparatus including a first disk on which servo information is formed to measure information for correcting a distortion synchronized with a rotation frequency of the servo information as first correction information. The disk-apparatus correcting system includes a storing unit that stores information for correcting a distortion synchronized with the rotation frequency of the servo information of a second disk apparatus including a second disk on which the servo information is formed using a common master medium with the first disk, as second correction information in advance. The first disk apparatus uses information calculated based on the second correction information stored in the storing unit, as measurement information when measuring the first correction information.

A method according to still another aspect of the present invention is for manufacturing a disk apparatus by writing servo information on a first disk and mounting the first disk on which the servo information is written into the disk apparatus. The method includes acquiring, from a second disk apparatus including a second disk on which the servo information is formed using a common master medium with the first disk, information for correcting a distortion synchronized with the rotation frequency of the servo information in the second disk apparatus, as second correction information; calculating, based on the second correction information, measurement information that is used by a first disk apparatus including the first disk when measuring the first correction information for correcting a distortion synchronized with the rotation frequency of the servo information in the first disk apparatus; and measuring including inputting the measurement information to the first disk apparatus, and causing the first disk apparatus to measure the first correction information.

A control apparatus according to still another aspect of the present invention controls positioning of a head on a track of a first disk on which servo information is formed. The control apparatus includes a storing unit that stores first correction information for correcting a distortion synchronized with a rotation frequency of the servo information, the first correction information being measured based on the servo information of the first disk; and a control unit that controls the positioning of the head on a target track by correcting the servo information of the first disk with the first correction information stored in the storing unit. Measurement information that is used for measuring the first correction information is calculated based on second correction information for correcting a distortion synchronized with the rotation frequency of the servo information in other disk apparatus including a second disk on which the servo information is formed using a common master medium with the first disk.

The above and other objects, features, advantages and technical and industrial significance of this invention will be better understood by reading the following detailed description of presently preferred embodiments of the present invention, when considered in connection with the accompanying drawings.

BRIEF DESCRIPTION OF THE DRAWINGS

FIG. 11 is a drawing for explaining the configuration of distortion correction value information and correction average information;

FIG. 17 is a flowchart of the procedure in the operation performed by the host computer when the distortion correction value information is measured while the magnetic disk apparatus is disconnected from the host computer.

DETAILED DESCRIPTION OF THE PREFERRED EMBODIMENTS

Exemplary embodiments of the present invention will be explained in detail below with reference to the accompanying drawings.

Figure 1:
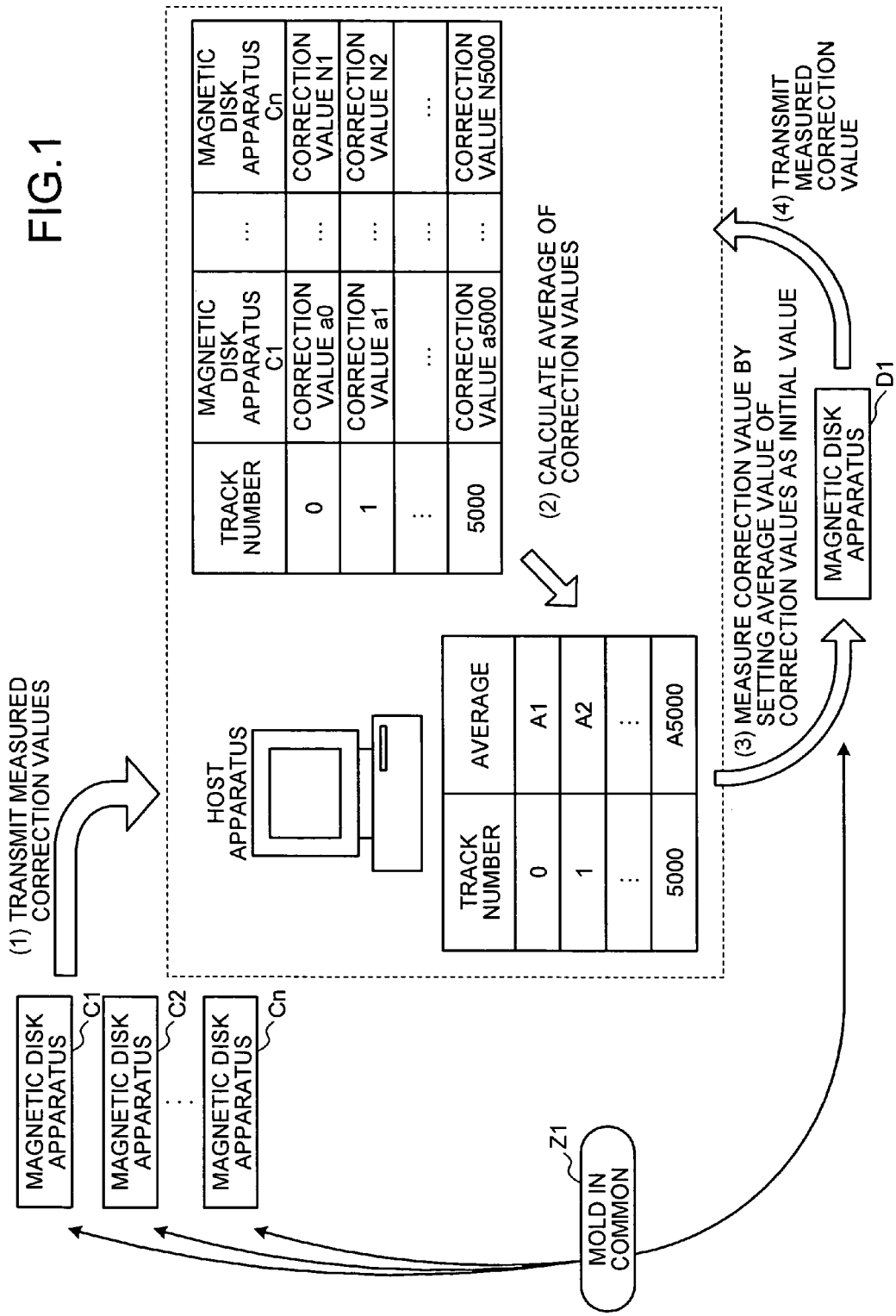
FIG. 1 is a drawing for explaining the concept of the present invention.

FIG. 1 is a drawing for explaining the concept of the present invention. Each of magnetic disk apparatuses C1 to Cn shown in FIG. 1 has servo information that is formed using a mold in common among the magnetic disks respectively included in the magnetic disk apparatuses C1 to Cn. When the magnetic disk apparatuses C1 to Cn are manufactured, correction values (i.e. the distortion correction value information, which is described later; the second correction information) that are used for correcting distortions (the deviations in the positions of the tracks) being in the servo information and in synchronization with the rotation frequency of the magnetic disk that is included in the respective magnetic disk apparatus are measured.

(1) The correction values for correcting the distortions in the servo information are transmitted to a predetermined host apparatus (i.e. a host computer 101, which is described later) and stored into a storing unit in the host apparatus. (2) The host apparatus calculates an average of the correction values. When a magnetic disk apparatus D1 that includes a magnetic disk (i.e. the first disk) on which servo information is formed using the mold in common with the magnetic disks (i.e. the second disks) included in the magnetic disk apparatuses C1 to Cn is newly manufactured, the magnetic disk apparatus D1 obtains the average of the correction values from the host apparatus. (3) When measuring the correction value (the first correction information) for correcting distortions in the servo information on the magnetic disk, the newly manufactured magnetic disk apparatus D1 performs the measuring process by setting the average of the correction values obtained from the host apparatus as an initial value (the initial correction value). (4) Having measured the correction value for correcting the distortions in the servo information of the magnetic disk, the magnetic disk apparatus D1 transmits the measured correction value to the host apparatus. Then, the processings (2) to (4) are repeated. With this arrangement, because the magnetic disk apparatus D1 sets the average of the correction values obtained from the host apparatus as the initial value for measuring the correction value, it is possible to shorten the period of time required for measuring the correction value.

In the explanation above, the magnetic disk apparatus D1 corresponds to the disk apparatus and the first disk apparatus that are defined in the claims. The magnetic disk apparatuses C1 to Cn correspond to the second disk apparatuses defined in the claims.

Figure 2:
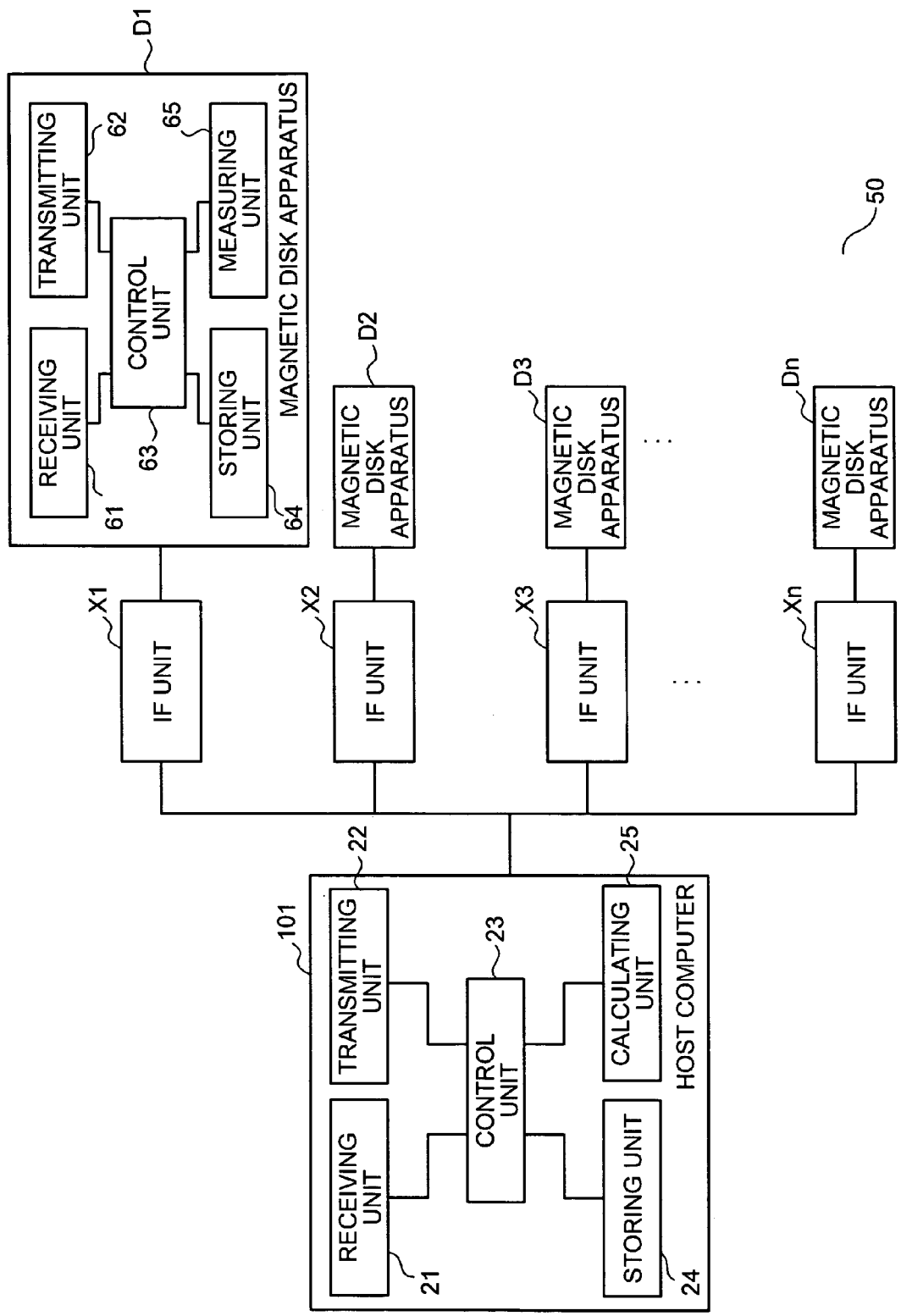
FIG. 2 is a functional block diagram of a disk-apparatus correcting system according to an embodiment of the present invention.

FIG. 2 is a functional block diagram of a disk-apparatus correcting system 50 according to the present embodiment. The disk-apparatus correcting system 50 includes the host computer (an information providing apparatus) 101, which is a computer apparatus on the host side (on the host side), one or more magnetic disk apparatuses D1 to Dn (where n is a natural number), and interface (IF) units X1 to Xn each of which connects a different one of the magnetic disk apparatuses D1 to Dn to the host computer 101.

The host computer 101 includes a receiving unit 21, a transmitting unit 22, a control unit 23, a storing unit (a storage apparatus) 24, and a calculating unit (a calculating apparatus) 25. The receiving unit 21 obtains (receives) a track number and a correction value (i.e. information related to the deviation in the position of the track; hereinafter, "distortion correction value information") for correcting distortions in the servo information on the magnetic disk corresponding to the track number, from a disk apparatus (not shown) in which servo information is recorded using a mold in common (a master medium) with the magnetic disk apparatuses D1 to Dn. Also, after each of the magnetic disk apparatuses D1 to Dn has measured the distortion correction value information, the receiving unit 21 receives a track number and the distortion correction value information that corresponds to the track number from the magnetic disk apparatuses D1 to Dn.

The calculating unit 25 performs, for example, an averaging process on the obtained distortion correction value information for each of the track numbers (in correspondence with the number of sectors) and stores the averaged data (hereinafter, "correction average information") into the storing unit 24. The calculating unit 25 also calculates new correction average information for each of the track numbers using the distortion correction value information received from the magnetic disk apparatuses D1 to Dn and the distortion correction value information that has been stored from before and stores the new correction average information into the storing unit 24. The storing unit 24 is a storing unit that stores therein the distortion correction value information and the correction average information. The transmitting unit 22 transmits, via the IF unites X1 to Xn, the correction average information stored in the storing unit 24 to the magnetic disk apparatuses D1 to Dn that measure distortion correction values. The control unit 23 controls the receiving unit 21, the transmitting unit 22, the storing unit 24, and the calculating unit 25.

Each of the magnetic disk apparatuses D1 to Dn includes a receiving unit (an input unit) 61 that receives (inputs) an initial correction value (measurement information) that is used when distortion correction value information is measured, from an external apparatus (the host computer 101), a measuring unit 65 that measures the distortion correction value information, a transmitting unit (an output unit) 62 that transmits the distortion correction value information to the outside of the magnetic disk apparatus, and a storing unit 64 that stores therein the initial value that is used when the distortion correction value information is measured and has been received from the host computer 101. A control unit 63 controls the receiving unit 61, the transmitting unit 62, the storing unit 64, and the measuring unit 65.

Each of the magnetic disk apparatuses D1 to Dn includes a magnetic disk. On the magnetic disk included in each of the magnetic disk apparatuses D1 to Dn, information (servo information) for controlling the determination of the position with respect to the target track by performing the servo track write process is recorded. According to the present embodiment, the servo information is recorded on the magnetic disk included in each of the magnetic disk apparatuses D1 to Dn, using a mold in common for magnetic transfer, discrete tracks, patterned media, or the like.

When newly measuring distortion correction value information, each of the magnetic disk apparatuses D1 to Dn receives, via the host computer 101, the correction average information that has been stored in the storing unit 24 from before, and uses the correction average information as an initial value for measuring the distortion correction value information. Each of the magnetic disk apparatuses D1 to Dn stores therein the distortion correction value information that has been measured and also transmits the distortion correction value information to the host computer 101 via the corresponding one of the IF unites X1 to Xn.

Each of the IF unites X1 to Xn connects a different one of the magnetic disk apparatuses D1 to Dn to the host computer 101 using a Hard Disk Drive (HDD) interface such as an Advanced Technology Attachment (ATA) adaptor, a Small Computer System Interface (SCSI) adaptor, or the like.

Figure 3:
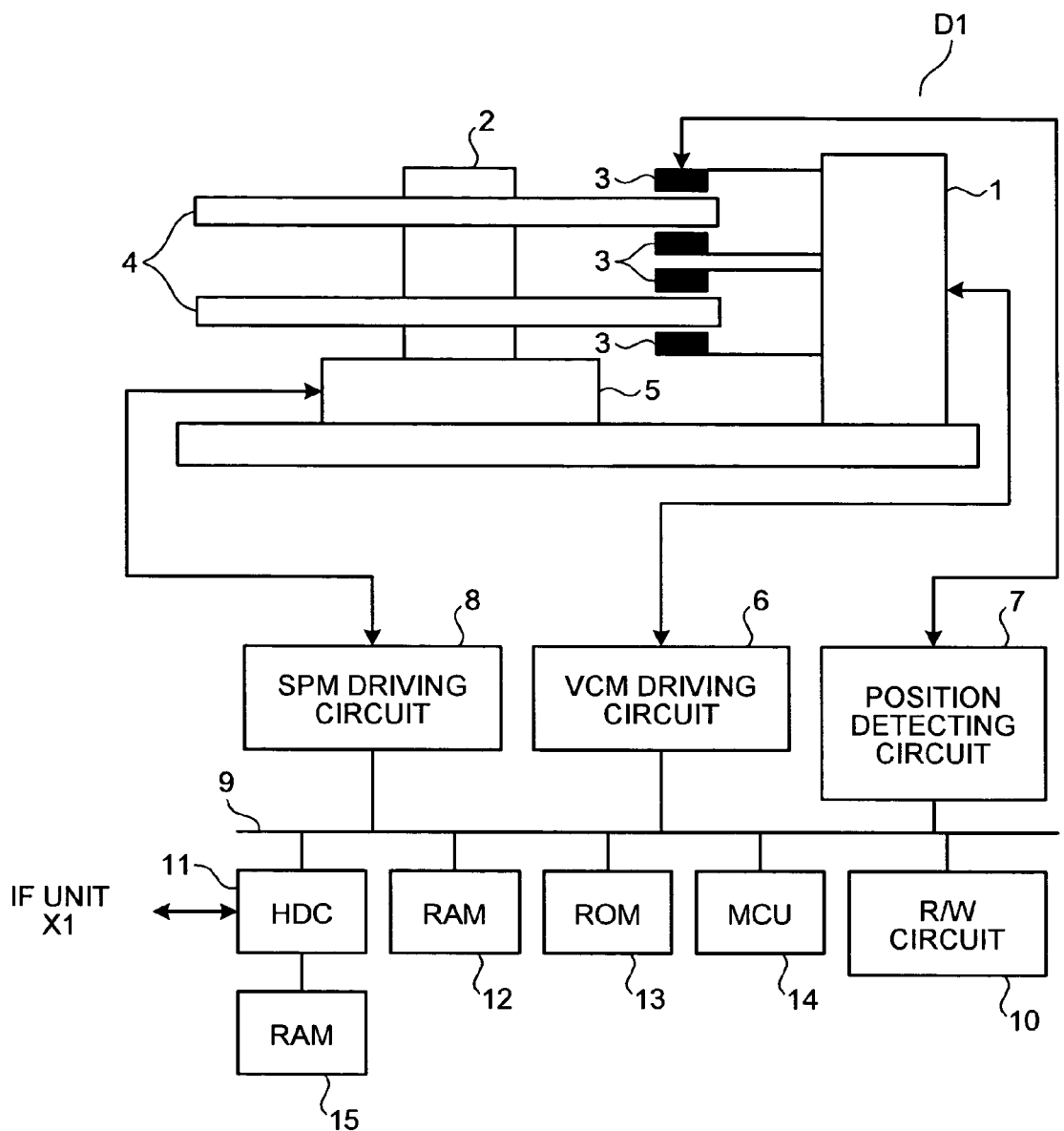
FIG. 3 is a drawing of the configuration of a magnetic disk apparatus according to the present embodiment.

FIG. 3 is a drawing of the configuration of the magnetic disk apparatus according to the present embodiment. Because the magnetic disk apparatuses D1 to Dn have the same configuration with one another, the magnetic disk apparatus D1 is used as an example in the following explanation. The magnetic disk apparatus D1 includes magnetic disks (magnetic storage media) 4 on each of which servo information is magnetically recorded.

An actuator 1 is configured so as to include a voice coil motor (VCM) that rotates on a rotation shaft 2 at the center. The actuator 1 has magnetic heads 3 on the tips on the magnetic disks 4 side and moves the magnetic heads 3 in the radial direction of the magnetic disks 4. The actuator 1 drives the magnetic heads 3 so that the positions of the magnetic heads 3 are determined on the target tracks defined by the servo information.

The magnetic disks 4 are provided on the rotation shaft 2 of a spindle motor 5. The spindle motor 5 makes the magnetic disks 4 rotate by rotating the rotation shaft 2. Each of the magnetic heads 3 includes a reading element (a read head) for reading data recorded on the magnetic disk 4 and a writing element (a write head) for writing data onto the magnetic disk 4 (not shown).

In the present example, two magnetic disks 4 and four magnetic heads 3 are included in the magnetic disk apparatus D1. The magnetic disks 4 and the magnetic heads 3 are simultaneously driven by one actuator, namely, the actuator 1.

Data is written to and read from the magnetic disks 4 while the actuator 1 is controlling the magnetic heads 3 so that they are positioned above the center of the target tracks and at the time when the target sector rotates and comes to the positions of the magnetic heads 3.

A position detecting circuit 7 is connected to the magnetic heads 3 and converts position signals (position information of the magnetic heads 3 with respect to the magnetic disks 4; analog signals) that are read by the magnetic heads 3 from the magnetic disks 4 into digital signals. The position detecting circuit 7 inputs the converted digital signals to a micro controller unit (MCU; a control apparatus) 14.

A spindle motor (SPM) driving circuit 8 is connected to the spindle motor 5 and drives the spindle motor 5. A voice coil motor (VCM) driving circuit 6 is connected to the voice coil motor for the actuator 1 and drives the actuator 1 by supplying a driving electric current to the voice coil motor. The read/write (R/W) circuit 10 controls reading and writing of data performed by the magnetic heads 3.

The MCU 14 detects the current positions of the magnetic heads 3 with respect to the magnetic disks 4, based on the digital position signals transmitted from the position detecting circuit 7 and calculates a VCM driving instruction value based on the difference between the detected current position and the target position. The MCU 14 performs the position demodulation of the magnetic heads 4 with respect to the magnetic disks 4 and the servo control, based on the VCM driving instruction value.

A Read Only Memory (ROM) 13 stores therein a control program used by the MCU 14 and the like. A Random Access Memory (RAM) 12 temporarily stores therein the read data that has been read from the magnetic disks 4 and the write data to be written onto the magnetic disks 4.

A hard disk controller (HDC) 11 judges the position (the position of the magnetic heads 3 with respect to the magnetic disks 4) within one circumference of the magnetic disks 4, based on the sector number in the servo information read from the magnetic disks 4 and records or plays back data onto or from the magnetic disks 4. The HDC 11 is connected to the IF unit X1 via an HDD interface such as an ATA adaptor, an SCSI adaptor, or the like and have communication with the host computer 101. A bus 9 connects the position detecting circuit 7, the SPM driving circuit 8, the VCM driving circuit 6, the R/W circuit 10, the MCU 14, the ROM 13, the RAM 12, the HDC 11, and a RAM 15 to one another.

The HDC 11 includes the functions of the receiving unit 61 and the transmitting unit 62 that are shown in FIG. 2. The MCU 14 includes the functions of the measuring unit 65 and the control unit 63 that are shown in FIG. 2. The RAM includes the function of the storing unit 64 that is shown in FIG. 2.

In this example, the configuration of the magnetic disk apparatus D1 including two magnetic disks 4 is presented as an example of the magnetic disk apparatus D1; however, it is acceptable to configure the magnetic disk apparatus D1 so as to include one magnetic disk 4 or three or more of the magnetic disks 4.

Figure 4:
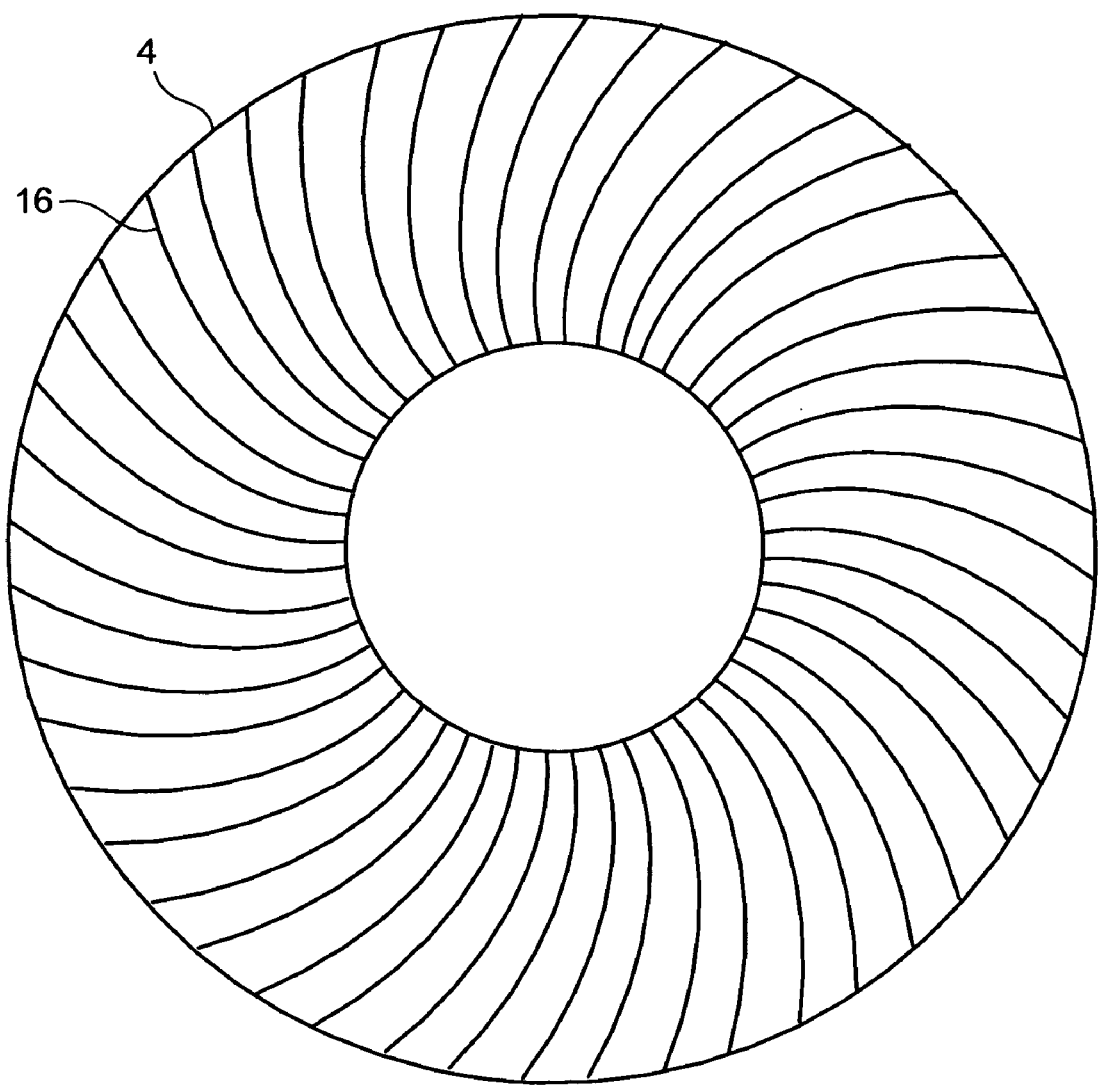
FIG. 4 is a drawing of an example of a configuration to arrange servo signals on a magnetic disk.

FIG. 4 is a drawing of an example of a configuration to arrange servo signals (servo information) on the magnetic disk. On each of the magnetic disks 4, servo signals (position signals) 16 are recorded in the shape of circular arcs extending in the radial direction from the rotation center. The actuator 1 detects the servo signals 16 intermittently while making the magnetic disks 4 rotate at a predetermined rotation speed.

Figure 5:
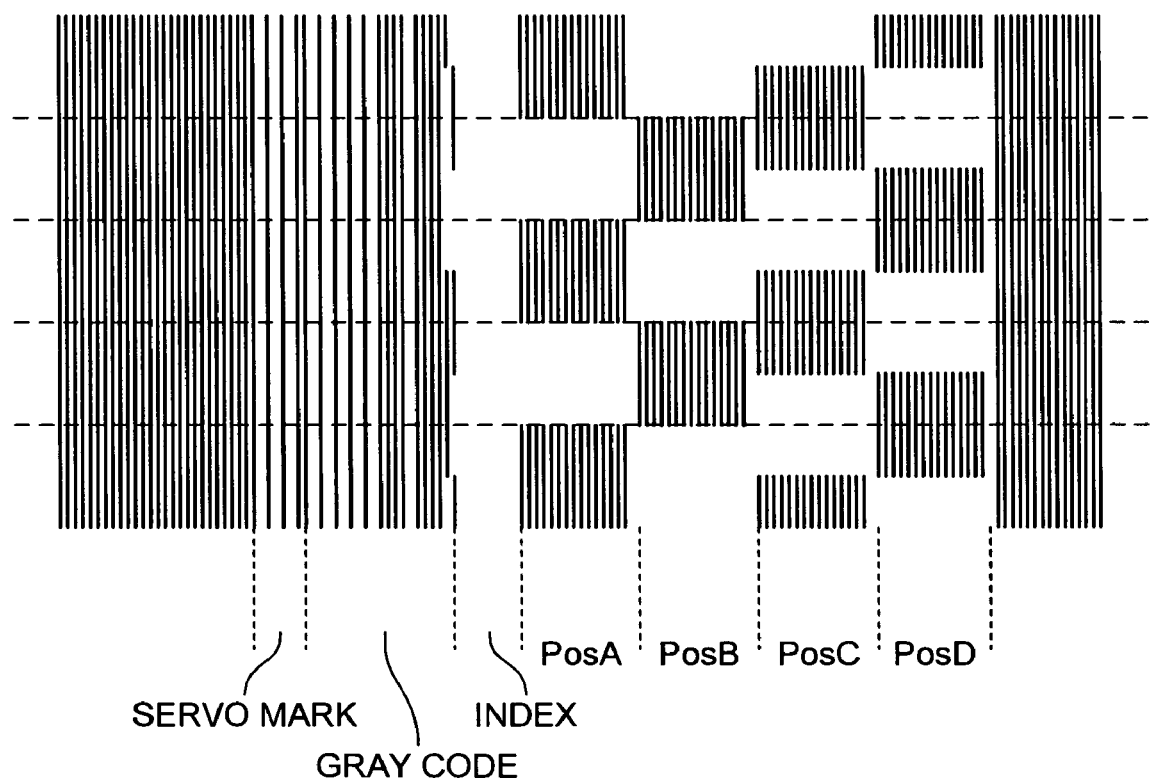
FIG. 5 is an enlargement view of the servo signals shown in FIG. 4.

FIG. 5 is an enlargement view of the servo signals 16 shown in FIG. 4. The servo signals 16 include a Servo Mark that indicates the starting position of the servo signals 16, a Gray Code that indicates each of the track numbers arranged in a concentric fashion in the radial direction on the magnetic disks 4, an Index that indicates the position within one circumference (within each of the tracks on the magnetic disks 4), and two phase servo signals (PosA, PosB, PosC, and PosD; the offset information) that indicate detailed position deviation amounts in the radial direction.

Figure 6:
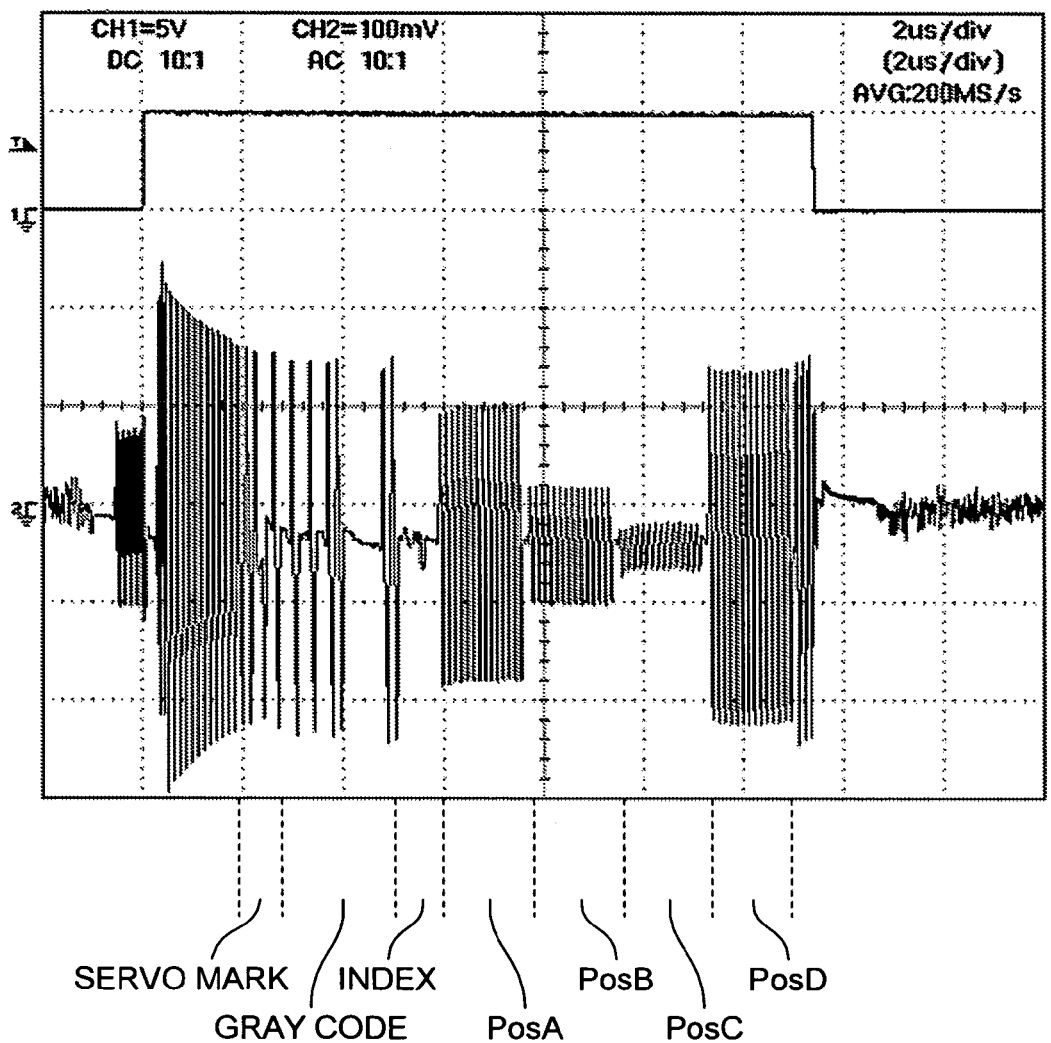
FIG. 6 is a drawing of an example of signal waveforms obtained when the servo signals shown in FIG. 5 are detected on the magnetic disk apparatus.

Next, the signal waveforms obtained when the servo signals 16 shown in FIG. 5 are detected on the magnetic disk apparatus D1 will be explained. FIG. 6 is a drawing of an example of the signal waveforms obtained when the servo signals shown in FIG. 5 are detected on the magnetic disk apparatus.

The position detecting circuit 7 detects the positions of the magnetic heads 3 in the radial direction, using the Gray Code and the two phase servo signals (PosA, PosB, PosC, and PosD). Also, the position detecting circuit 7 detects the positions of the magnetic heads 3 in the circumferential direction, based on the Index. For example, the position detecting circuit 7 sets the sector number at the time when the Index is detected to Number 0 and, every time the servo signal 16 is detected, counts up the sector number so as to obtain the sector numbers of the sectors within the tracks.

The sector numbers of the servo signals 16 that have been obtained by the position detecting circuit 7 are used as the reference when data is recorded onto or played back from the magnetic disks 4. Another arrangement is acceptable in which one Index is provided in one circumference so that sector numbers are used instead of the Indexes.

Figure 7:
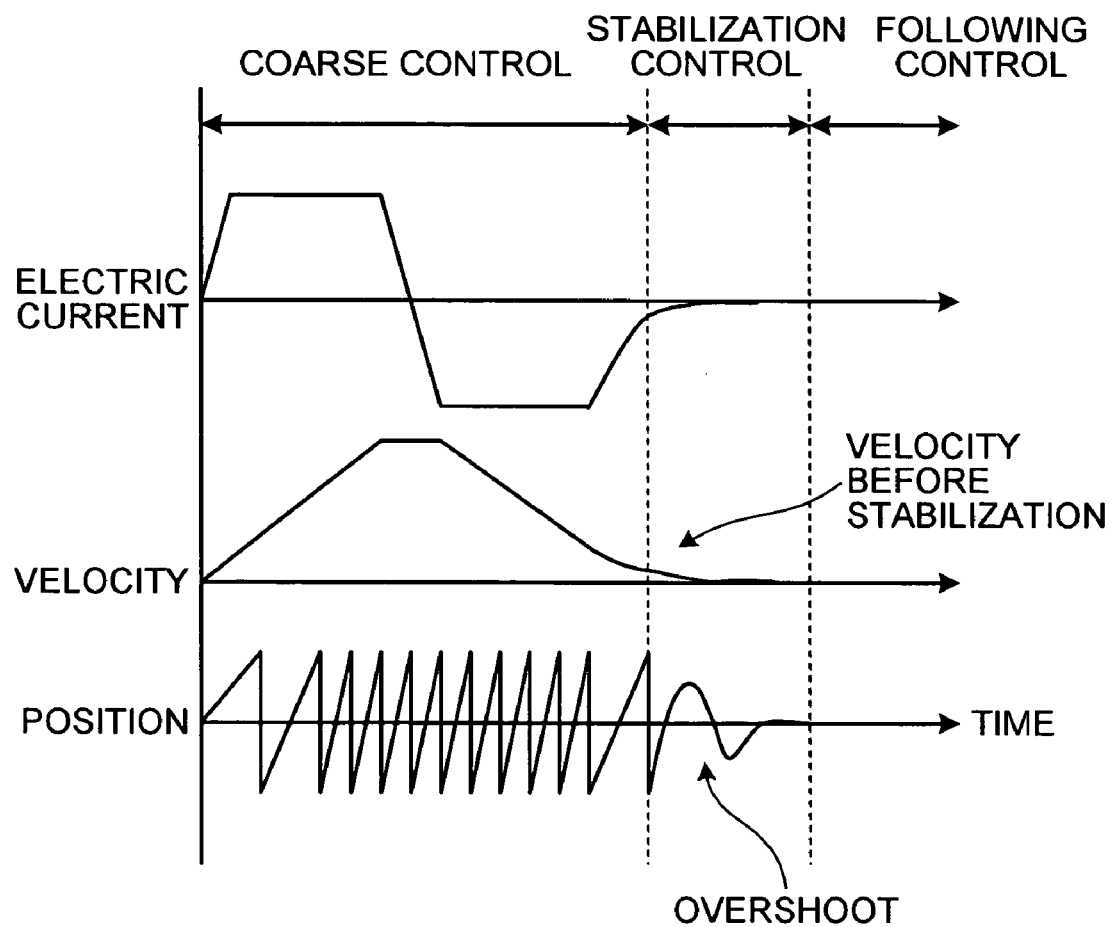
FIG. 7 is a drawing of an example of waveforms from the start of a seeking process to a following process.

FIG. 7 is a drawing of an example of the waveforms from the start of a seeking process to a following process. In the present example, an example of the waveforms from the start of a seeking process through the end of the seeking process, and then to the stabilization and the following process is presented. According to the present embodiment, the method and the apparatus for correcting the position deviation mainly when the following control is performed will be explained.

Shown in FIG. 7 are transition of control from the start of a seeking process to move the magnetic heads 3 from the predetermined track positions to the target track positions, the electric current ("CURRENT") of the actuator 1, the velocity of the actuator 1 (the magnetic heads 3) ("VELOCITY"), and the position of the actuator 1 (the magnetic heads 3) ("POSITION). Of these elements, only the electric current of the actuator 1 and the position of the actuator 1 can be actually observed.

The MCU 14 detects the current positions of the magnetic heads 3 with respect to the magnetic disks 4 based on the digital position signal transmitted from the position detecting circuit 7 and calculates (servo calculation) a VCM driving instruction value, based on the difference between the detected current positions and the target positions. The MCU 14 transmits the calculated VCM driving instruction value to the VCM driving circuit 6. The VCM driving circuit 6 supplies a suitable electric current corresponding to the VCM driving instruction value to the voice coil motor as a driving electric current so as to drive the actuator 1.

During the seek controlling process, the magnetic heads 3 are moved to the target positions through a sequential transition from the coarse control, to the stabilization control, and then to the following control. The coarse control in this situation is velocity control. The stabilization control and the following control are position control. All of these types of control need to be exercised after the current positions of the magnetic heads 3 are detected.

To check the positions of the magnetic heads 3, servo information is recorded in advance on the magnetic disks 4 as shown in FIG. 4, and the Servo Mark, the Gray Code, the Index, and the two phase servo signals in the servo information (the servo signals 16) are read by the magnetic heads 3. The position detecting circuit 7 then converts the servo signals 16 into digital signals. Further, the MCU 14 demodulates the positions and controls the actuator 1 using the control system, which is described later.

Figure 8:
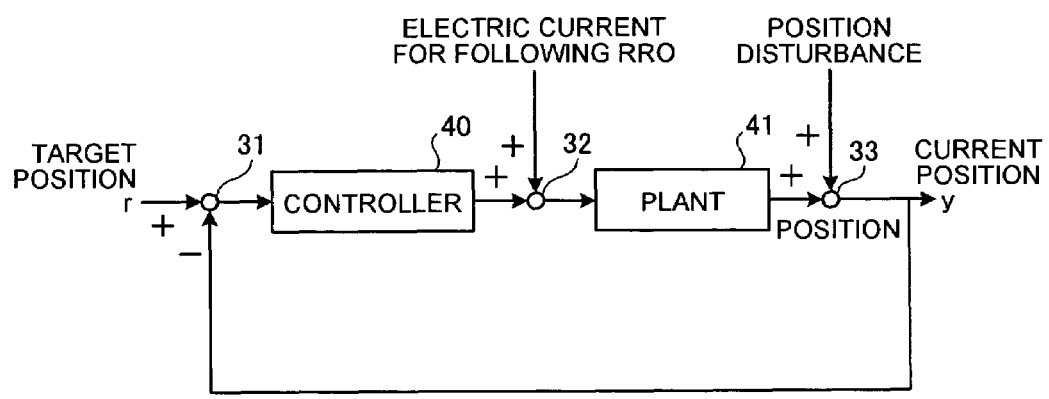
FIG. 8 is a drawing for explaining a control system for a magnetic head when a track is followed.
Figure 9:
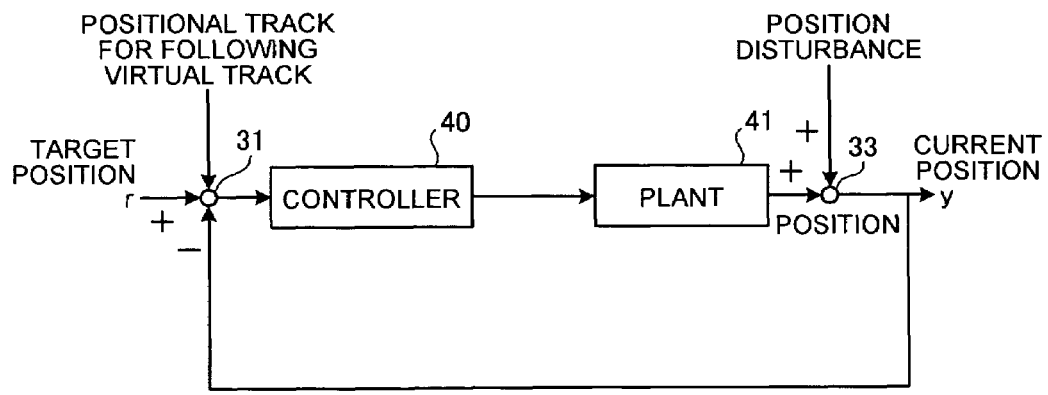
FIG. 9 is a drawing for explaining the control system for the magnetic head when a virtual track is followed.

FIG. 8 is a drawing for explaining the control system for the magnetic head when the track is followed. FIG. 9 is a drawing for explaining the control system for the magnetic head when the virtual track is followed.

With the control systems shown in FIG. 8 and FIG. 9, the positions of the magnetic heads 3 are controlled based on the target position r and the current position y. In each of the control systems, a calculator 31 calculates the positional difference between the target position r and the current position y and inputs the calculated positional difference to a controller 40.

The controller 40 calculates an electric current (the driving electric current for the voice coil motor) for eliminating the positional difference between the target position r and the current position y and inputs the calculated electric current to a plant 41 (the actuator 1). The actuator 1 drives the magnetic heads 3 to move, based on the electric current input by the controller 40.

The plant 41 inputs information related to the position of the actuator 1 (the magnetic heads 3) with respect to the base on which the actuator 1 and the magnetic disks 4 are mounted, to a calculator 33. Positional disturbance (information related to the positions of the magnetic disks 4 with respect to the base) is also input to the calculator 33. The positional disturbance in this example includes a positional component (Repeatable Runout (RRO)) for correcting the distortions in the servo signals on the magnetic disks 4, a positional component for following the eccentricity of the magnetic disks 4, and a positional component for correcting sways of the spindle motor, and a positional component (Non-repeatable Runout (Non-RRO)) that corresponds to noises. Accordingly, a position modulation is performed on the servo signals from the magnetic heads 3 by the calculator 33 (the demodulation block), and the current position y (the positions of the magnetic heads 3 with respect to the magnetic disks 4) is obtained.

In this example, the RRO is in synchronization with the rotation frequency of the magnetic disks 4. The NRRO is not in synchronization with the rotation frequency of the magnetic disks 4. The positions of the magnetic heads 3 are detected by the position detecting circuit 7 shown in FIG. 3 and output as the current position y.

In the control system shown in FIG. 8, a calculator 32 adds the electric current for following the RRO to the electric current from the controller 40, and inputs the result of the addition to the plant 41. In the control system shown in FIG. 9, the calculator 31 adds a track for following the virtual track to the positional difference between the target position r and the current position y, while ignoring the RRO, and inputs the result of the addition to the controller 40. According to the present embodiment, because the RRO resulting from the distortions in the mold is set as the initial value (the correction average information) for measuring the distortion correction value information, it is appropriate to measure the RRO resulting from elements other than the distortions in the mold.

Figure 10:
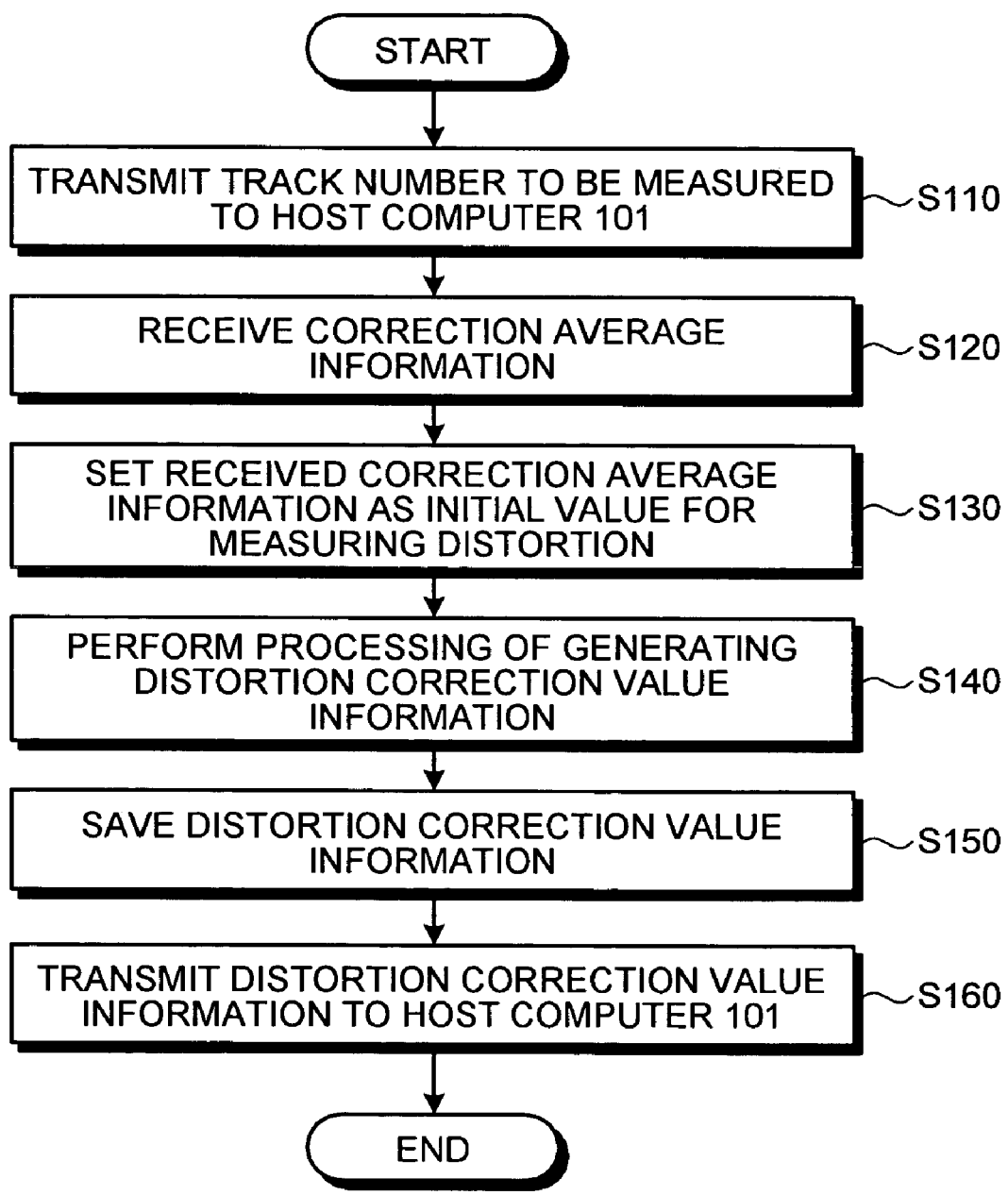
FIG. 10 is a flowchart of the procedure in the operation performed by the magnetic disk apparatus.

FIG. 10 is a flowchart of the procedure in the operation performed by the magnetic disk apparatus according to the present embodiment.

The processing (the operation) for measuring distortion information (distortion correction information) on one track is shown in the flowchart in FIG. 10. When a magnetic disk apparatus, such as the magnetic disk apparatuses D1 to Dn, is newly manufactured, the manufacturing target, namely, any one of the magnetic disk apparatuses D1 to Dn, is connected to the host computer 101 via the corresponding one of the IF unites X1 to Xn. Then, the correction value (the distortion correction value information) for correcting the distortions in the servo information on the magnetic disks 4 is measured by the one of the magnetic disk apparatuses D1 to Dn (the measuring unit 65). In the following section, the procedure in the operation performed by the magnetic disk apparatus will be explained using an example in which the magnetic disk apparatus to be newly manufactured is the magnetic disk apparatus D1.

When the transmitting unit 22 included in the host computer 101 transmits instruction information to the magnetic disk apparatus D1 via the IF unit X1, so that the correction value (the distortion correction value information) for correcting the distortions in the servo information on the magnetic disks 4 is measured, the HDC 11 (the receiving unit 61) included in the magnetic disk apparatus D1 receives the instruction information.

The position detecting circuit 7 included in the magnetic disk apparatus D1 detects the track number being the measured target, based on the gray code in the servo signals 16 and transmits the track number being the measured target to the host computer 101 via the bus 9, the HDC 11 (the transmitting unit 62), and the IF unit X1 (Step S110).

Upon having received the track number being the measured target from the magnetic disk apparatus D1, the receiving unit 21 included in the host computer 101 extracts correction average information (the data obtained by averaging the distortion correction value information for each of the track numbers) that corresponds to the received track number, out of the storing unit 24.

If no correction average information that corresponds to the track number is stored in the storing unit 24 in advance (if no correction average information is calculated in advance), when the receiving unit 21 receives the track number being the measured target from the magnetic disk apparatus D1, the host computer 101 calculates correction average information, using the distortion correction value information stored in the storing unit 24.

FIG. 11 is a drawing for explaining the configuration of the distortion correction value information and the correction average information. This example shows the configuration of the distortion correction value information and the correction average information for a magnetic disk apparatus that includes magnetic disks on which servo information is recorded, using one mold in common. Accordingly, when the types of molds or the individual molds are mutually different, mutually different storage areas in the storing unit 24 are assigned to each of them, so that distortion correction value information and correction average information are stored therein.

The distortion correction value information is data for magnetic disk apparatuses (corresponding to the apparatuses No. 1 to No. n) for which distortion correction value information has been measured before the magnetic disk apparatuses D1 to Dn are measured. In other words, the distortion correction value information in this situation is information (data) of the tracks corresponding to the number of sectors for each of the track numbers measured by the magnetic disk apparatuses corresponding to the apparatuses No. 1 to No. n. In the present example, the track numbers of the magnetic disk apparatuses (the apparatuses No. 1 to No. n) indicate the pieces of distortion correction value information that are numbered from 0 to 5000. As many pieces of distortion correction value information as the number of servo sectors for each of the tracks are needed. In the frames shown in the drawing, the measurement data corresponding to the number of sectors is included. It is possible to easily correct the distortions in the servo information on the magnetic disks by storing the distortion correction value information for each of the tracks.

The correction average information is a value obtained by averaging the distortion correction value information for each of the sectors within each tracks of each magnetic disk apparatus. As explained above, in the storing unit 24, the distortion correction value information and the correction average information are stored while keeping the information in correspondence with each of the track numbers and with each of the magnetic disk apparatuses.

In each of the magnetic disk apparatuses, because the stopper positions of the magnetic heads 3 vary for each of the measuring surfaces of the magnetic disks 4, the measurement ranges which the magnetic heads 3 are able to access vary for each of the magnetic disks 4. Accordingly, as for the distortion correction value information for the magnetic disk apparatuses, the data (the distortion correction value information) is uneven (the areas that do not have oblique lines in the drawing) on both ends of the track numbers (around No. 0 and around No. 5000). In other words, the number of pieces of distortion correction value information used in the averaging process is different near both ends of the track numbers. Also, when some or all of the magnetic disks 4 have a defect and there are one or more tracks for which the measuring process cannot be performed, the number of pieces of distortion correction value information used in the averaging process for these tracks is reduced.

Every time each of the magnetic disk apparatuses measures the distortion correction value information, the measured distortion correction value information (data) is stored into a predetermined storage area within the storing unit 24. Also, the calculating unit 25 included in the host computer 101 calculates the correction average information, based on the distortion correction value information at predetermined timing and stores the correction average information into a predetermined storage area within the storing unit 24.

When a magnetic disk apparatus such as any one of the magnetic disk apparatuses D1 to Dn is newly manufactured, the correction average information that has been so far measured and calculated is transmitted from the host computer 101 (the storing unit 24) to the newly manufactured one of the magnetic disk apparatuses D1 to Dn.

In the present example, the newly manufactured magnetic disk apparatus is the magnetic disk apparatus D1. Having received the track number being the measured target from the magnetic disk apparatus D1, the host computer 101 transmits the correction average information stored in the storing unit 24 to the magnetic disk apparatus D1. The correction average information is transmitted to the magnetic disk apparatus D1 via the IF unit X1.

The magnetic disk apparatus D1 receives the correction average information from the HDC 11 and inputs the received correction average information to the MCU 14 via the bus 9 (step S120). The MCU 14 included in the magnetic disk apparatus D1 sets the correction average information as the initial value for measuring the distortion correction value information. The magnetic disk apparatus D1 (the measuring unit 65) then starts the processing of measuring the distortions in the servo information on the magnetic disks 4 (step S130).

Upon having started the processing of measuring the distortions in the servo information on the magnetic disks 4, the MCU 14 included in the magnetic disk apparatus D1 performs the processing of generating distortion correction value information while taking defects and eccentricity of the magnetic disks 4, sways of the spindle motor, and the like into consideration (step S140).

The magnetic disk apparatus D1 sets the correction average information as the initial value for generating the distortion correction value information (for measuring distortions) and generates the distortion correction value information. The magnetic disk apparatus D1 then saves the distortion correction value information into a predetermined storage area (the storing unit 64) (step S150). Further, the magnetic disk apparatus D1 transmits the generated distortion correction value information to the host computer 101 (step S160).

The processing at steps S110 through S160 is performed for each of the track numbers being the measured targets. In other words, every time the magnetic disk apparatus D1 measures distortion correction value information that corresponds to a track number being the measured target, the magnetic disk apparatus D1 transmits the track number being the measured target to the host computer 101. Then, the magnetic disk apparatus D1 receives the correction average information that corresponds to the track number being the measured target from the host computer 101, and generates distortion correction value information. Further, the magnetic disk apparatus D1 transmits the distortion correction value information that corresponds to the track number being the measured target to the host computer 101. The magnetic disk apparatus D1 may collectively transmit pieces of distortion correction value information that correspond to track numbers being the measured targets to the host computer 101.

Figure 12:
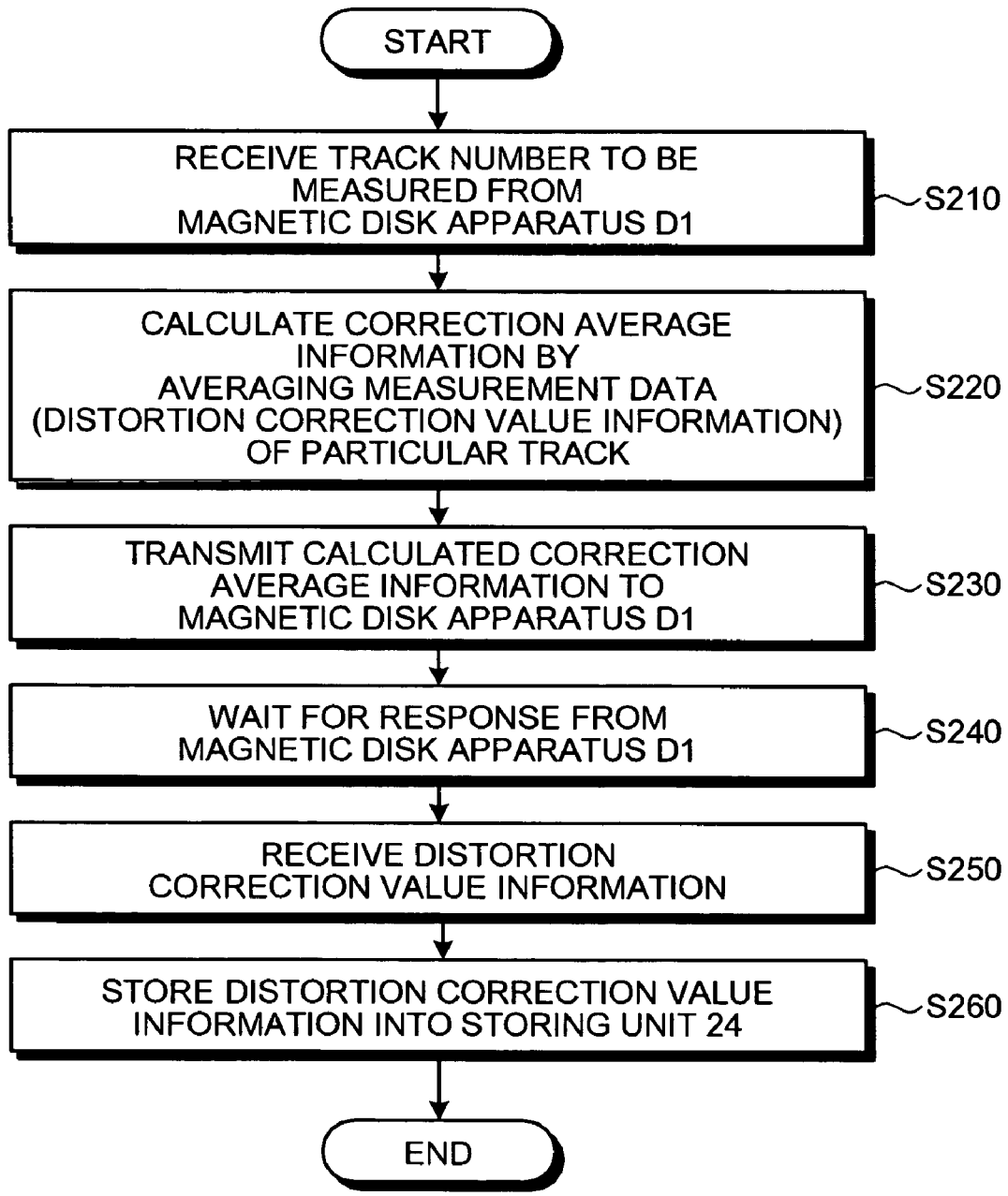
FIG. 12 is a flowchart of the procedure in the operation performed by a host computer.

FIG. 12 is a flowchart of the procedure in the operation performed by the host computer 101. Shown in the flowchart in FIG. 12 is the processing (the operation) for measuring distortion information (the distortion correction information) for one track.

When a magnetic disk apparatus, such as any one of the magnetic disk apparatuses D1 to Dn, is newly manufactured, the one of the magnetic disk apparatuses D1 to Dn being a manufactured target is connected to the host computer 101 via the corresponding one of the IF unites X1 to Xn. A correction value for correcting the distortions in the servo information on the magnetic disks 4 (the distortion correction value information) is measured by the one of the magnetic disk apparatuses D1 to Dn. In the following section, an example in which the newly manufactured magnetic disk apparatus is the magnetic disk apparatus D1 will be used to explain the procedure in the operation performed by the host computer 101.

The transmitting unit 22 included in the host computer 101 transmits instruction information to the magnetic disk apparatus D1 via the IF unit X1 so that the correction value (the distortion correction value information) for correcting the distortions in the servo information on the magnetic disks 4 is measured. When having received the instruction information, the magnetic disk apparatus D1 detects the track number being the measured target and transmits the track number being the measured target to the host computer 101 via the bus 9, the HDC 11, and the IF unit X1. Accordingly, the receiving unit 21 included in the host computer 101 receives track number being the measured target from the magnetic disk apparatus D1 (step S210).

The calculating unit 25 included in the host computer 101 extracts measurement data (the distortion correction value information) that corresponds to the received track number being the measured target out of the storing unit 24, and calculates correction average information (the data obtained by averaging the distortion correction value information for each of the track numbers), using the distortion correction value information (step S220). The calculated correction average information is stored into the storing unit 24. If correction average information has stored in the storing unit 24 in advance, the correction average information that corresponds to the track number being the measured target is extracted out of the storing unit 24.

The host computer 101 transmits the calculated correction average information to the magnetic disk apparatus D1 (step S230). Subsequently, the host computer 101 is in the state of waiting for a response from the magnetic disk apparatus D1 (step S240).

The magnetic disk apparatus D1 generates distortion correction value information and transmits the generated distortion correction value information to the host computer 101. The host computer 101 receives the distortion correction value information transmitted from the magnetic disk apparatus D1 (step S250). The host computer 101 then stores the received distortion correction value information into the storing unit 24 (step S260). The storing unit 24 stores therein the distortion correction value information received from the host computer 101 while keeping the information in correspondence with the track number and the magnetic disk apparatus D1.

In the explanation above, the example is used in which the information transmitted from the host computer 101 to the magnetic disk apparatus D1 is the correction average information, which is the data obtained by averaging the distortion correction value information for each of the track numbers; however, the data transmitted from the host computer 101 to the magnetic disk apparatus D1 is not limited to the correction average information. To be more specific, the host computer 101 may calculate the data to be transmitted to the magnetic disk apparatus D1 (the initial value to be used when the magnetic disk apparatus D1 calculates the distortion correction value information) by weighting the distortion correction value information in a predetermined manner.

When the servo information is formed on each of the magnetic disks 4, using a common master medium (the magnetic disks 4 are duplicated), the tendency of distortions in the servo information may vary depending on the number of times the servo information is formed. Accordingly, another arrangement is acceptable in which the host computer 101 calculates the correction average information by, for example, weighting the distortion correction value information for a magnetic disk apparatus including the magnetic disk 4 manufactured more recently more than the distortion correction value information for a magnetic disk apparatus including the magnetic disk 4 manufactured less recently.

Another arrangement is also acceptable in which the host computer 101 calculates the correction average information by eliminating a piece of distortion correction value information that is judged to be abnormal data (an abnormal value) in comparison with another piece of distortion correction value information. In this situation, the host computer 101 judges whether any one of pieces of distortion correction value information is abnormal, based on the median, the sigma, the variance, and the average of the pieces of distortion correction value information.

When the number of pieces of distortion correction value information that have been so far measured is small, there is a possibility that the degree of precision in the measurement may be low. For this reason, another arrangement is acceptable in which the magnetic disk apparatus D1 obtains, from the host computer 101, information of the number of magnetic disk apparatuses for which measurement has been done, simultaneously together with the correction average information. When the number of magnetic disk apparatuses (the value) is large, the magnetic disk apparatus D1 can reduce the number of rotation circles made by the magnetic disks 4 to measure the distortion correction information. Conversely, when the number of magnetic disk apparatuses is small, the number of rotation circles made by the magnetic disks 4 to measure the distortion correction information is increased so that the influence of noises can be eliminated.

The procedure in the operation performed by the disk-apparatus correcting system 50 when the host computer 101 transmits, to the magnetic disk apparatus D1, the number of pieces of data (the number of magnetic disk apparatuses; hereinafter "averaged quantity") used for calculating (through the averaging process) the correction average information, together with the correction average information will be explained below.

Figure 13:
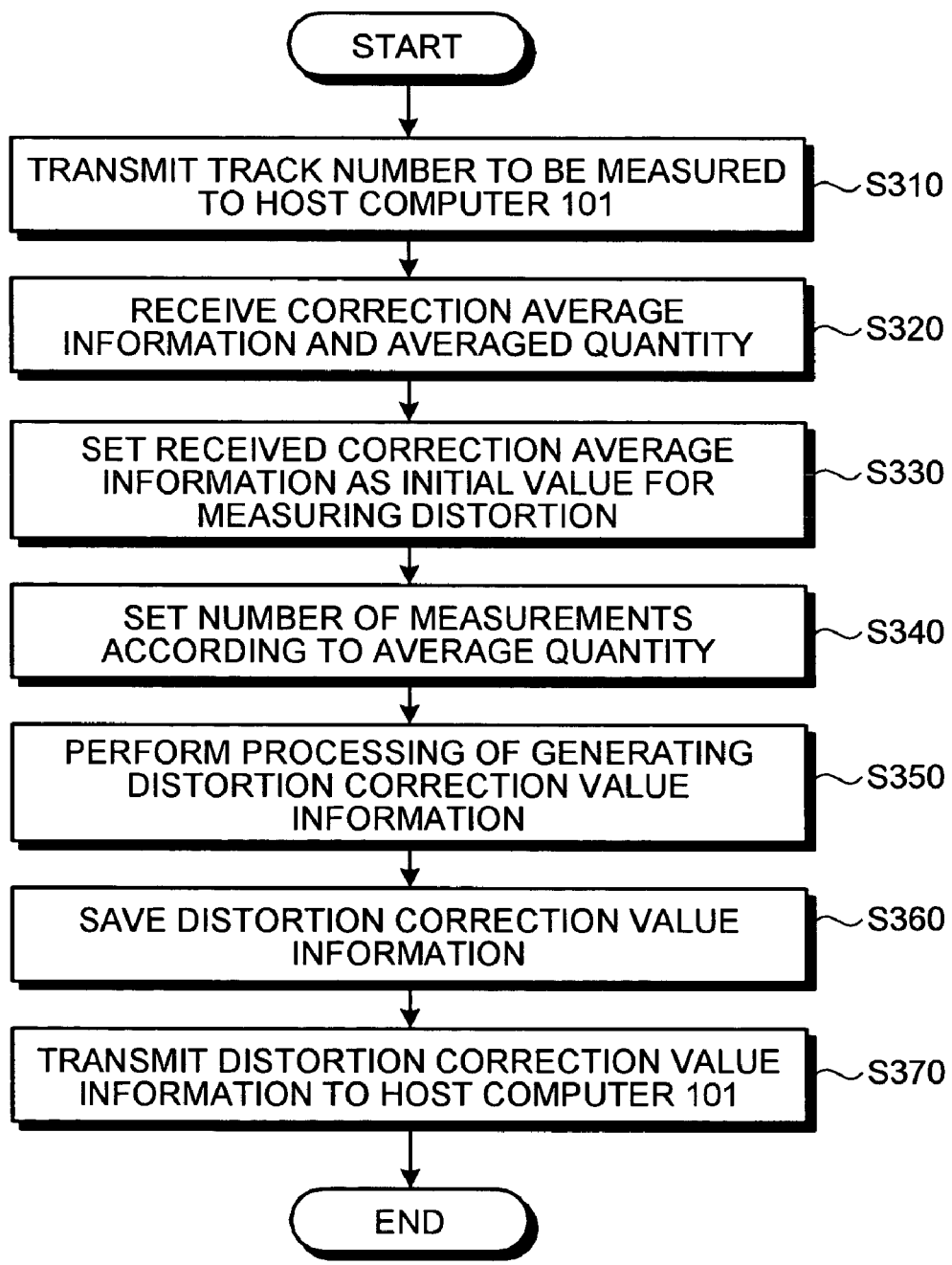
FIG. 13 is a flowchart of the procedure in the operation performed by the magnetic disk apparatus when receiving an averaged quantity.

FIG. 13 is a flowchart of the procedure in the operation performed by the magnetic disk apparatus when receiving the averaged quantity. In the following section, explanation of the procedure to perform the same processing as the procedure in the operation performed by the magnetic disk apparatus D1, as explained with reference to FIG. 8, will be omitted.

When the host computer 101 has transmitted instruction information to the magnetic disk apparatus D1 so that distortion correction value information is measured, the magnetic disk apparatus D1 receives the instruction information. The magnetic disk apparatus D1 detects the track number being the measured target and transmits the detected track number to the host computer 101 (step S310).

When having received the track number being the measured target from the magnetic disk apparatus D1, the host computer 101 extracts the correction average information that corresponds to the track number, out of the storing unit 24, and transmits the extracted correction average information to the magnetic disk apparatus D1. At this time, the host computer 101 transmits the averaged quantity, together with the correction average information, to the magnetic disk apparatus D1.

The magnetic disk apparatus D1 receives the correction average information and the averaged quantity from the host computer 101 (step S320). The magnetic disk apparatus D1 sets the correction average information as an initial value for measuring the distortion correction value information (step S330).

Also, the MCU 14 included in the magnetic disk apparatus D1 sets the number of rotation circles (the number of circles for measurement) of the magnetic disks 4 for measuring the distortion correction information according to the averaged quantity. At this time, for example, the MCU 14 included in the magnetic disk apparatus D1 sets the number of rotation circles of the magnetic disks 4 to a small number when the averaged quantity is larger than a predetermined value, and sets the number of rotation circles of the magnetic disks 4 to a large number when the averaged quantity is smaller than a predetermined value (step S340).

Subsequently, the magnetic disk apparatus D1 starts the processing for measuring the distortions in the servo information on the magnetic disks 4 and performs the processing of generating the distortion correction value information while taking defects and eccentricity of the magnetic disks 4, sways of the spindle motor, and the like into consideration (step S350).

Upon having generated the distortion correction value information (when having measured the distortions), the magnetic disk apparatus D1 saves the distortion correction value information into a predetermined storage area and also transmits the distortion correction value information to the host computer 101 (steps S360 and S370).

Figure 14:
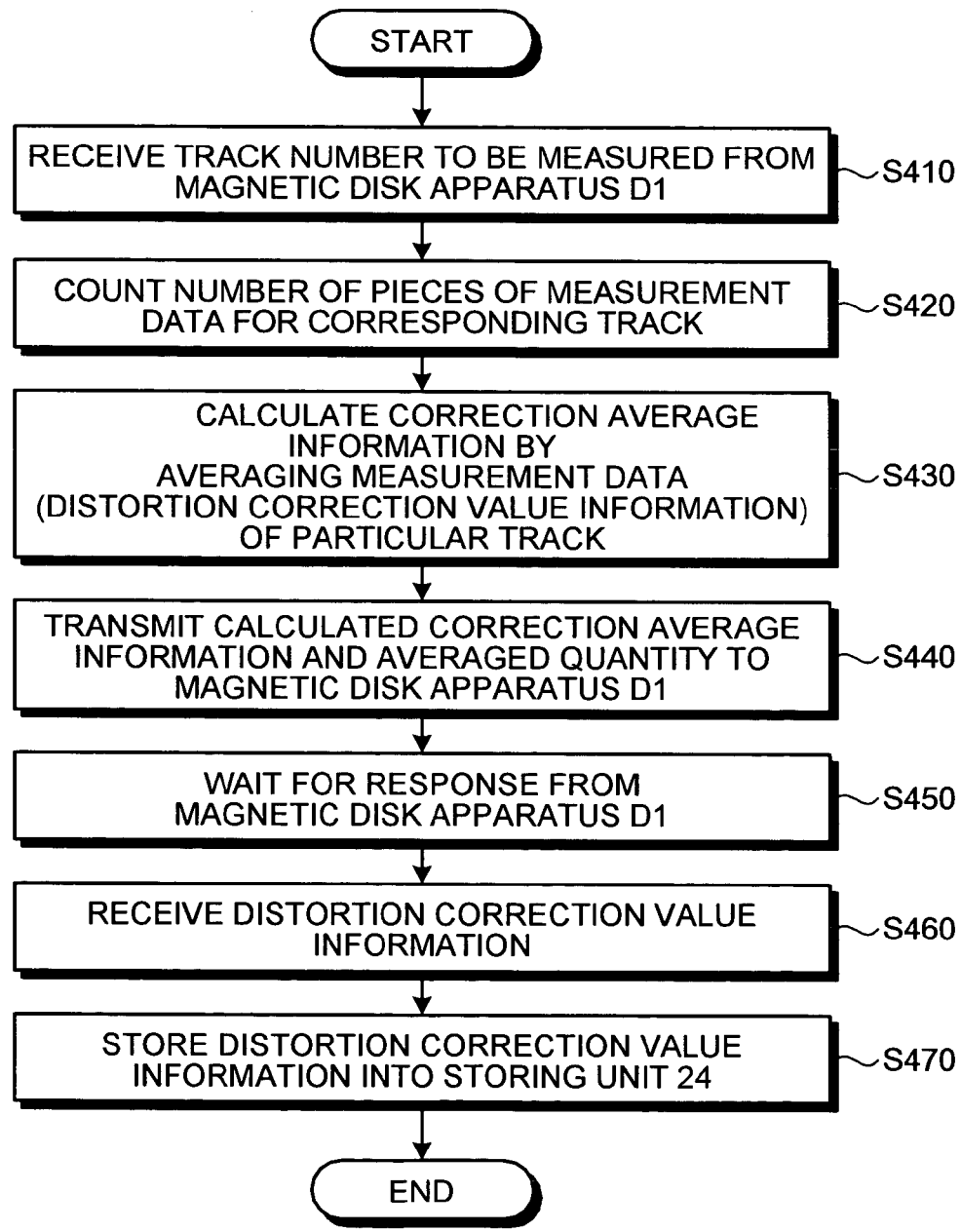
FIG. 14 is a flowchart of the procedure in the operation performed by a host computer when transmitting an averaged quantity.

FIG. 14 is a flowchart of the procedure in the operation performed by the host computer 101 when transmitting the averaged quantity. In the following section, explanation of the procedure to perform the same processing as the procedure in the operation performed by the host computer 101, as explained with reference to FIG. 12, will be omitted.

The host computer 101 transmits instruction information to the magnetic disk apparatus D1 so that distortion correction value information is measured. Having received the instruction information, the magnetic disk apparatus D1 detects the track number being the measured target and transmits the detected track number to the host computer 101. Accordingly, the host computer 101 receives the track number being the measured target from the magnetic disk apparatus D1 (step S410).

The calculating unit 25 included in the host computer 101 counts the number of pieces of measurement data (the distortion correction value information) that correspond to the received track number being the measured target, out of the storing unit 24 (step S420).

The calculating unit 25 included in the host computer 101 extracts the distortion correction value information that corresponds to the received track numbers being the measured target, out of the storing unit 24, and calculates the correction average information, using the distortion correction value information (step S430). The calculated correction average information is stored into the storing unit 24.

The host computer 101 transmits the calculated correction average information and the counted averaged quantity to the magnetic disk apparatus D1 (step S440). Subsequently, the host computer is in the state of waiting for a response from the magnetic disk apparatus D1 (step S450).

The magnetic disk apparatus D1 generates distortion correction value information and transmits the generated distortion correction value information to the host computer 101. The host computer 101 receives the distortion correction value information transmitted from the magnetic disk apparatus D1 (step S460). The host computer 101 then stores the received distortion correction value information into the storing unit 24 (step S470). The storing unit 24 stores therein the distortion correction value information received from the host computer 101 while keeping the information in correspondence with the track number and the magnetic disk apparatus D1.

According to the present embodiment, the example in which, when the host computer 101 has received the track number being the measured target from the magnetic disk apparatus D1, the host computer 101 calculates the correction average information and also counts the averaged quantity has been explained; however, another arrangement is acceptable in which the host computer 101 performs the processing of calculating the correction average information and the processing of counting the averaged quantity in advance and stores the calculation result and the counting result into the storing unit 24.

In this situation, the host computer 101 performs the processing of calculating the correction average information and the processing of counting the averaged quantity when, for example, having received distortion correction value information from a predetermined magnetic disk apparatus.

When determination of the positions of the magnetic heads 3 is controlled, it is acceptable to use an appropriate one of the method in which the deviation in the position of the track is followed and the method in which a virtual track is generated and the virtual track is followed without the deviation in the position of the track being followed, according to the situation. The distortion correction value information measured by the magnetic disk apparatuses D1 to Dn is influenced by the eccentricity of the magnetic disks 4. The influence of the eccentricity is present at a low frequency. Accordingly, an arrangement is acceptable in which the magnetic disk apparatuses D1 to Dn exercise control so as to follow the deviation in the position of the track when the frequency is low and not to follow the deviation in the position of the track when the frequency is high.

In addition to the distortions in the servo information resulting from the molds, sometimes a problem arises because of the distortions in each of the magnetic disks 4. The distortions in each of the magnetic disks 4 are present as a component in common among the tracks. Accordingly, another arrangement is acceptable in which the magnetic disk apparatuses D1 to Dn exercise control at first so as to follow the distortions that are in common among the tracks, and then measures the components that are different for each of the tracks.

When the servo information is formed on the magnetic disks 4 using a magnetic transfer method, the magnetic disk apparatuses D1 to Dn use the distortion correction value information at the write positions as the measured targets. The distortion correction value information depending on the molds is obtained by measuring the positional tracks that do not follow the distortion in the tracks. The distortion correction value information obtained this way is used in the control of determination of the positions.

Alternatively, when the servo information is formed using discrete tracks or patterned media, it is necessary that the tracks are accurately followed. Thus, an arrangement is acceptable in which the driving signal for the actuator 1 to follow the tracks is measured as distortion correction value information and stored into the storage 24 or the magnetic disk apparatus D1.

According to the present embodiment, the example in which the disk apparatus is one of the magnetic disk apparatuses D1 to Dn is explained; however, the disk apparatus may be other types of disk apparatus, such as an optical disk apparatus for a Compact Disk (CD), a Read-Only Memory (ROM), a Digital Versatile Disk Read Only Memory (DVD-ROM), or an magneto optical disk apparatus for a Magneto Optical Disk (MO) or a Mini Disk (MD).

Furthermore, according to the present embodiment, the magnetic disk apparatus D1 measures the distortion correction value information while the host computer 101 is connected to the magnetic disk apparatus D1; however, another arrangement is acceptable in which the magnetic disk apparatus D1 measures the distortion correction value information while the host computer 101 is disconnected from (i.e. not connected to) the magnetic disk apparatus D1. In this situation, at first, the host computer 101 is connected to the magnetic disk apparatus D1, and the correction average information is transmitted from the host computer 101 to the magnetic disk apparatus D1 so that the magnetic disk apparatus D1 stores therein the correction average information. Then, the magnetic disk apparatus D1 is disconnected from the host computer 101. Subsequently, the magnetic disk apparatus D1 is put into a temperature-controlled chamber or the like, and distortion correction value information is measured by the magnetic disk apparatus D1, using the stored correction average information. When the magnetic disk apparatus D1 has finished measuring the distortion correction value information, the magnetic disk apparatus D1 is connected to the host computer 101 again, and the magnetic disk apparatus D1 transmits the measured distortion correction value information to the host computer 101.

Moreover, according to the present embodiment, the magnetic disk apparatus D1 measures the distortion correction value information while the host computer 101 is connected to the magnetic disk apparatus D1; however, another arrangement is acceptable in which the magnetic disk apparatus D1 measures the distortion correction value information while the host computer 101 is disconnected from (i.e. not connected to) the magnetic disk apparatus D1.

Figure 15:
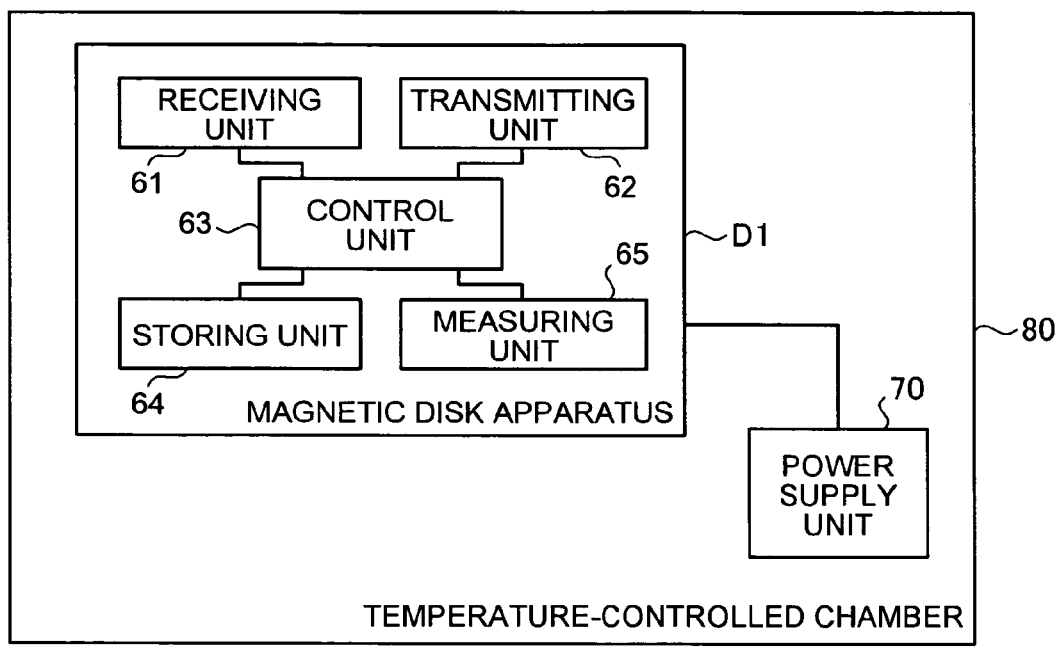
FIG. 15 is a drawing of a measuring system in which the distortion correction value information is measured while the host computer is disconnected from the magnetic disk apparatus.

FIG. 15 is a drawing of a measuring system in which the distortion correction value information is measured while the host computer is disconnected from the magnetic disk apparatus.

In the measuring system, the magnetic disk apparatus D1 is connected to a power supply unit 70 within a temperature-controlled chamber 80. The magnetic disk apparatus D1 measures distortion correction value information, using the electric power supplied by the power supply unit 70. At this time, the inside of the temperature-controlled chamber 80 is set to a predetermined temperature, and the magnetic disk apparatus D1 measures the distortion correction value information under the condition set with the predetermined temperature.

Figure 16:
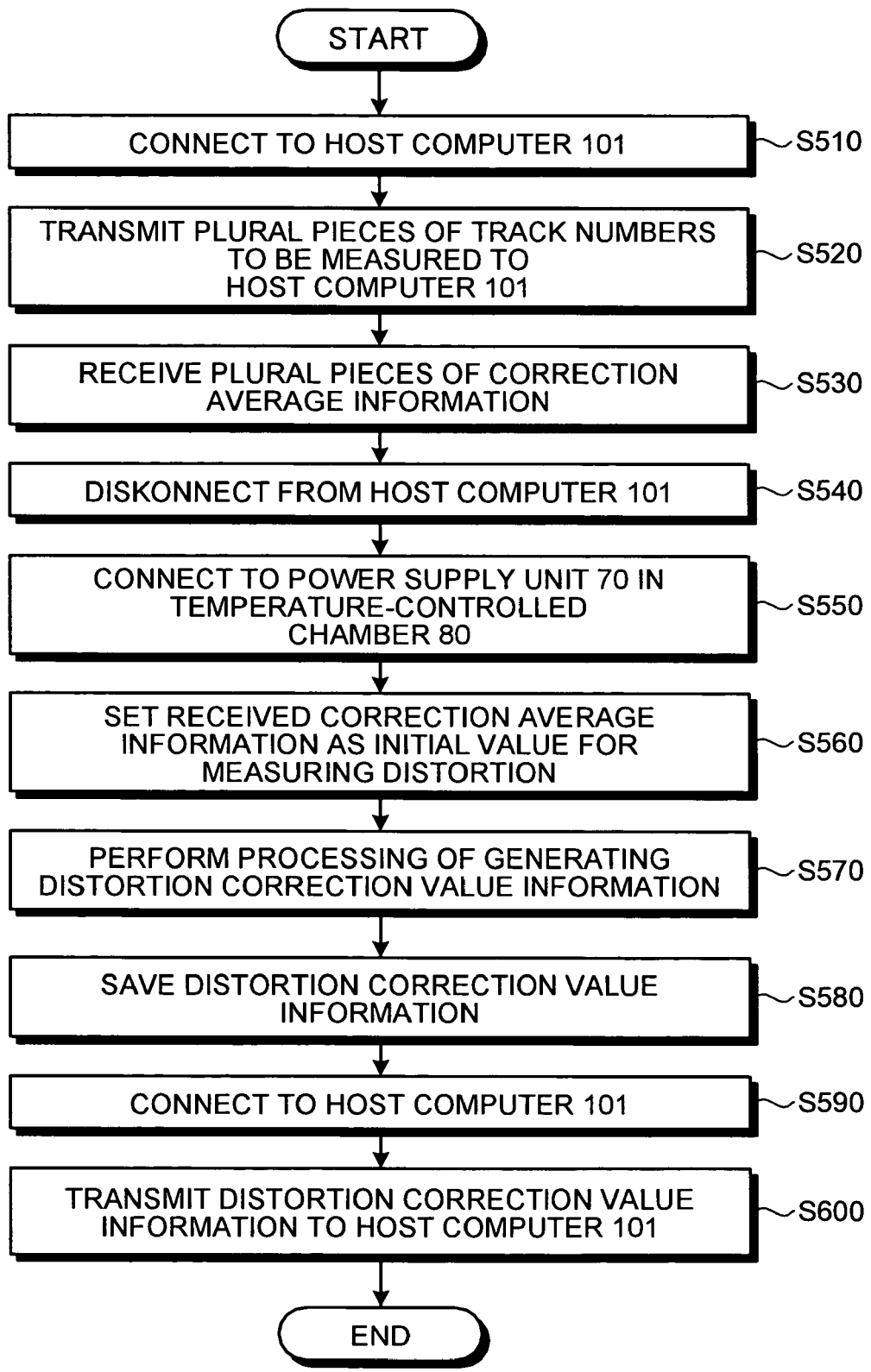
FIG. 16 is a flowchart of the procedure in the operation performed by the magnetic disk apparatus when the distortion correction value information is measured while the magnetic disk apparatus is disconnected from the host computer.

FIG. 16 is a flowchart of the procedure in the operation performed by the magnetic disk apparatus when the distortion correction value information is measured while the magnetic disk apparatus is disconnected from the host computer. In the following section, explanation of the procedure to perform the same processing as the procedure in the operation performed by the magnetic disk apparatus D1, as explained with reference to FIG. 8, will be omitted.

Firstly, the host computer 101 is connected to the magnetic disk apparatus D1 (step S510). In other words, the receiving unit 61 and the transmitting unit 62 that are included in the magnetic disk apparatus D1 are connected to the transmitting unit 22 and the receiving unit 21 that are included in the host computer 101 via the IF unit X1. When the host computer 101 has transmitted instruction information to the magnetic disk apparatus D1 so that distortion correction value information is measured, the magnetic disk apparatus D1 receives the instruction information. The magnetic disk apparatus D1 then detects the track numbers being the measured targets and transmits the detected track numbers to the host computer 101 (step S520). At this time, the magnetic disk apparatus D1 specifies a plurality of track numbers (for example, all the track numbers) and transmits the specified track numbers to the host computer 101. In other words, at this time, the magnetic disk apparatus D1 specifies an area (a range) of track numbers that is necessary for the measurement in the temperature-controlled chamber 80 and transmits the specified area to the host computer 101.

When having received the track numbers being the measured targets from the magnetic disk apparatus D1, the host computer 101 extracts pieces of correction average information that correspond to the track numbers respectively, out of the storing unit 24, and transmits the extracted pieces of correction average information to the magnetic disk apparatus D1. The magnetic disk apparatus D1 collectively receives the pieces of correction average information from the host computer 101 (step S530). The magnetic disk apparatus D1 stores the pieces of correction average information into the storing unit 64 while keeping the pieces of information in correspondence with the track numbers.

Subsequently, the host computer 101 is disconnected from the magnetic disk apparatus D1. In other words, the receiving unit 61 and the transmitting unit 62 that are included in the magnetic disk apparatus D1 are disconnected from the transmitting unit 22 and the receiving unit 21 that are included in the host computer 101 (the IF unit X1) (step S540). Then, the magnetic disk apparatus D1 is put into the temperature-controlled chamber 80, and the magnetic disk apparatus D1 is connected to the power supply unit 70 (step S550).

The magnetic disk apparatus D1 sets the pieces of correction average information that are stored in the storing unit 64 as initial values for measuring the distortion correction value information (step S560). The magnetic disk apparatus D1 then starts the processing of measuring the distortions in the servo information on the magnetic disks 4 and performs the processing of generating the distortion correction value information while taking defects and eccentricity of the magnetic disks 4, sways of the spindle motor, and the like into consideration (step S570). In this situation, the magnetic disk apparatus D1 stores therein the pieces of correction average information for each of the track numbers and sequentially measures the distortion correction value information, using the pieces of correction average information that correspond to the track numbers.

Upon having generated the distortion correction value information (when having measured the distortions), the magnetic disk apparatus D1 saves the distortion correction value information into a predetermined storage area (e.g. the storing unit 64) (step S580). Subsequently, the host computer 101 is connected to the magnetic disk apparatus D1 (step S590). In other words, the receiving unit 61 and the transmitting unit 62 that are included in the magnetic disk apparatus D1 are connected to the transmitting unit 22 and the receiving unit 21 that are included in the host computer 101 via the IF unit X1. Then, the distortion correction value information for each of the tracks is transmitted from the transmitting unit 62 included in the magnetic disk apparatus D1 to the host computer 101 (the receiving unit 21) (step S600).

FIG. 17 is a flowchart of the procedure in the operation performed by the host computer 101 when the distortion correction value information is measured while the magnetic disk apparatus is disconnected from the host computer 101. In the following section, the procedure to perform the same processing as the procedure in the operation performed by the host computer 101, as explained with reference to FIG. 12, will be omitted.

The host computer 101 is connected to the magnetic disk apparatus D1 (step S710). In other words, the receiving unit 61 and the transmitting unit 62 that are included in the magnetic disk apparatus D1 are connected to the transmitting unit 22 and the receiving unit 21 that are included in the host computer 101 via the IF unit X1.

The host computer 101 (the transmitting unit 22) transmits instruction information to the magnetic disk apparatus D1 so that distortion correction value information is measured. Having received the instruction information, the magnetic disk apparatus D1 detects a plurality of track numbers being the measured targets (an area of the track numbers) and transmits the detected track numbers to the host computer 101. Accordingly, the host computer 101 (the receiving unit 21) receives the track numbers being the measured targets from the magnetic disk apparatus D1 (step S720).

The calculating unit 25 included in the host computer 101 extracts the distortion correction value information that corresponds to the received track numbers being the measured targets, out of the storing unit 24, and calculates correction average information, using the distortion correction value information (step S730). The calculated correction average information is stored into the storing unit 24.

The transmitting unit 22 included in the host computer 101 transmits the calculated (pieces of) correction average information for each of the track numbers to the magnetic disk apparatus D1 (step S740). Subsequently, the host computer 101 is disconnected from the magnetic disk apparatus D1. In other words, the receiving unit 61 and the transmitting unit 62 that are included in the magnetic disk apparatus D1 are disconnected from the transmitting unit 22 and the receiving unit 21 that are included in the host computer 101 (the IF unit X1) (step S750).

Then, because the magnetic disk apparatus D1 performs the processing of generating distortion correction value information (measuring the distortions) in the temperature-controlled chamber 80, the host computer 101 is in the state of waiting for the measurement to be performed by the magnetic disk apparatus D1 (step S760).

When the magnetic disk apparatus D1 has generated (pieces of) distortion correction value information within the temperature-controlled chamber 80, the host computer 101 is connected to the magnetic disk apparatus D1 (step S770). In other words, the receiving unit 61 and the transmitting unit 62 that are included in the magnetic disk apparatus D1 are connected to the transmitting unit 22 and the receiving unit 21 that are included in the host computer 101 via the IF unit X1. Then, the host computer is in the state of waiting for a response from the magnetic disk apparatus D1 (step S780).

The magnetic disk apparatus D1 generates the distortion correction value information and transmits the generated distortion correction value information to the host computer 101. The host computer 101 (the receiving unit 21) receives the distortion correction value information transmitted from the magnetic disk apparatus D1 (step S790). The host computer 101 then stores the received distortion correction value information into the storing unit 24 (step S800). The storing unit 24 stores therein the distortion correction value information received from the host computer 101 while keeping the information in correspondence with the track numbers and the magnetic disk apparatus D1.

As explained so far, in this example, the pieces of correction average information that correspond to the track numbers are transmitted from the host computer 101 to the magnetic disk apparatus D1. The magnetic disk apparatus D1 measures the distortion correction value information, using the pieces of correction average information that correspond to the track numbers. Thus, it is possible to make the transmission and the reception of the information between the magnetic disk apparatus D1 and the host computer 101 efficient. Further, because the magnetic disk apparatus D1 stores therein, in advance, the pieces of correction average information that correspond to the track numbers, even after the magnetic disk apparatus D1 is disconnected from the host computer 101, the magnetic disk apparatus is able to sequentially measure a plurality of pieces of distortion correction value information.

In the measuring system in which the distortion correction value information is measured while the host computer 101 is disconnected from the magnetic disk apparatus D1, an arrangement is acceptable in which the host computer 101 transmits the averaged quantity together with the correction average information to the magnetic disk apparatus D1.

In addition, the example in which the magnetic disk apparatus D1 measures the distortion correction value information within the temperature-controlled chamber 80 after the magnetic disk apparatus D1 is disconnected from the host computer 101 is explained; however, another arrangement is acceptable in which the magnetic disk apparatus measures the information without being disconnected from the host computer 101. In other words, an arrangement is acceptable in which the host computer 101 transmits a plurality of pieces of correction average information that correspond to the track numbers to the magnetic disk apparatus D1, and subsequently the magnetic disk apparatus D1 measures the distortion correction value information by performing the same processing as the one explained with reference to FIG. 10, without the magnetic disk apparatus D1 being disconnected from the host computer 101.

It is possible to install the magnetic disk apparatus D1 manufactured using the disk-apparatus correcting system 50 described above into various types of information processing systems (information processing apparatuses). For example, it is possible to install the magnetic disk apparatus D1 into computers including personal computers, disk apparatuses including disk array apparatuses, portable terminals including mobile phones, portable music playback apparatuses, and portable TVs.

The host computer 101 obtains the track numbers and the correction values that are for correcting the distortions in the servo information on the magnetic disks 4 and correspond to the track numbers as the distortion correction value information (information related to the deviation in the positions of the tracks) from the magnetic disk apparatuses (the apparatuses No. 1 through No. n) and also calculates the correction average information by averaging the distortion correction value information. Thus, it is possible to provide the correction average information for the magnetic disk apparatuses D1 to Dn.

As explained above, according to an embodiment of the present embodiment, each of the magnetic disk apparatuses D1 to Dn uses the average (the correction average information) of the correction values (the correction value for determining the positions of the magnetic heads 3 on the target tracks; the distortion correction value information) for correcting the distortions in the servo information on the magnetic disks 4 on which the servo information is formed using a mold in common, as an initial value for measuring the correction value for correcting the distortions in the servo information on the magnetic disks 4 included in the respective magnetic disk apparatus itself. Thus, it is possible to shorten the time required for measuring the distortions in the servo information on the magnetic disks 4 included in the respective magnetic disk apparatus itself. Accordingly, the magnetic disk apparatuses D1 to Dn are able to correct the distortions in the servo signals on the magnetic disks 4 efficiently with the simple configuration.

Furthermore, according to an embodiment of the present embodiment, the first correction information for correcting the distortion in the servo information on the disk is measured using the measurement information that is calculated based on the second correction information for correcting the distortion in the servo information on the disk that is formed, using the mold in common. The determination of the position of the head on the target track is controlled using the first correction information. Thus, an effect is achieved where it is possible to control the determination of the position of the head on the target track efficiently with the simple configuration.

Moreover, according to an embodiment of the present embodiment, the first correction information is measured using the measurement information input from the external apparatus. Thus, an effect is achieved where it is possible to measure the first correction information for correcting the distortion in the servo information in a short period of time and to correct the distortion in the servo information on the disk efficiently with the simple configuration.

Furthermore, according to an embodiment of the present embodiment, the measurement information that is calculated based on the second correction information for correcting the distortion in the servo information on the disk formed using the mold in common is set as the initial correction value for measuring the first correction information. Thus, an effect is achieved where it is possible to measure the first correction information in an even shorter period of time and to correct the distortion in the servo information on the disk even more efficiently.

Moreover, according to an embodiment of the present embodiment, the measured first correction information is output to the external apparatus. Thus, an effect is achieved where it is possible to provide the external apparatus with the first correction information that makes it possible to control the determination of the position of the head on the target track efficiently and is measured by the disk apparatus itself.

Furthermore, according to an embodiment of the present embodiment, the second correction information is measured for each of the tracks on the disk. The first correction information is measured for each of the tracks using the measurement information that is for each of the tracks and is calculated based on the second correction information. Thus, an effect is achieved where it is possible to measure the first correction information efficiently and accurately and to correct the distortion in the servo information on the disk efficiently and accurately.

Moreover, according to an embodiment of the present embodiment, the plurality of pieces of measurement information for the tracks that correspond to the first correction information to be measured are collectively stored. The first correction information is sequentially measured for each of the tracks, using the pieces of measurement information. Thus, an effect is achieved where it is possible to correct the distortion in the servo information on the disk efficiently and promptly even when the disk apparatus is not connected to the external apparatus.

Furthermore, according to an embodiment of the present embodiment, the first correction information for correcting the distortion in the servo information on the disk is measured using the measurement information that is calculated based on the second correction information for correcting the distortion in the servo information on the disk that is formed using the mold in common. The disk apparatus controls the determination of the position of the head on the target track using the first correction information. Thus, an effect is achieved where it is possible to provide the information processing system that includes the disk apparatus that is able to control the determination of the position of the head on the target track efficiently with the simple configuration.

Moreover, according to an embodiment of the present embodiment, the first correction information for correcting the distortion in the servo information on the disk is measured using the measurement information that is calculated based on the second correction information for correcting the distortion in the servo information on the disk that is formed using the mold in common. The first correction information is transmitted to the first disk apparatus that includes the disk formed using the mold in common. Thus, an effect is achieved where it is possible to provide the first disk apparatus with the measurement information with which it is possible to correct the distortion in the servo information on the disk efficiently with the simple configuration.

Furthermore, according to an embodiment of the present embodiment, the measurement information is calculated using the plurality of pieces of second correction information that are measured by the second disk apparatus. Thus, an effect is achieved where it is possible to provide the first disk apparatus with the measurement information with which it is possible to correct the distortion in the servo information on the disk efficiently and accurately.

Moreover, according to an embodiment of the present embodiment, the plurality of pieces of measurement information for the tracks that correspond to the first correction information measured by the first disk apparatus are collectively transmitted to the first disk apparatus. Thus, an effect is achieved where it is possible to provide the first disk apparatus with the measurement information with which it is possible to correct the distortion in the servo information on the disk efficiently and promptly even when the first disk apparatus is not connected to the information providing apparatus.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk apparatus having a first disk on which servo information is formed, the disk apparatus comprising:
a storing unit that stores first correction information for correcting a distortion synchronized with a rotation frequency of the servo information, the first correction information being measured based on the servo information of the first disk; and
a control unit that controls positioning of a head on a target track by correcting the servo information of the first disk with the first correction information stored in the storing unit, wherein
measurement information that is used for measuring the first correction information is calculated based on second correction information for correcting a distortion synchronized with the rotation frequency of the servo information in other disk apparatus including a second disk on which the servo information is formed using a common master medium with the first disk.

2. The disk apparatus according to claim 1, further comprising:
an input unit that inputs the measurement information from an external apparatus; and
a measuring unit that measures the first correction information, using the measurement information input by the input unit, wherein
the storing unit stores the measurement information input by the input unit, transmits the measurement information to the measuring unit when the measuring unit measures the first correction information, and stores the first correction information measured by the measuring unit.

3. The disk apparatus according to claim 2, wherein
the measuring unit sets the measurement information as an initial correction value when measuring the first correction information.

4. The disk apparatus according to claim 1, wherein
a plurality of other disk apparatuses is provided, and
the measurement information is calculated based on a plurality of pieces of second correction information measured by the other disk apparatuses.

5. The disk apparatus according to claim 4, wherein
the measurement information is an average of the pieces of second correction information.

6. The disk apparatus according to claim 2, further comprising:
an output unit that outputs the first correction information measured by the measuring unit to the external apparatus.

7. The disk apparatus according to claim 2, wherein
the second correction information is measured for each track of the second disk, the input unit inputs the measurement information that is calculated based on the second correction information for each track of the second disk from the external apparatus, and the measuring unit measures the first correction information for each track of the first disk, using the measurement information input by the input unit.

8. The disk apparatus according to claim 2, wherein
the input unit inputs the measurement information for a track corresponding to the first correction information measured by the measuring unit each time the measuring unit measures the first correction unit from the external apparatus.

9. The disk apparatus according to claim 2, wherein
the input unit collectively inputs a plurality of pieces of measurement information for tracks corresponding to the first correction information measured by the measuring unit from the external apparatus,
the storing unit stores the pieces of measurement information, and
the measuring unit sequentially measures the first correction information for each of the tracks, using the pieces of measurement information stored in the storing unit.

10. The disk apparatus according to claim 2, wherein
the input unit is connected to the external apparatus when inputting the measurement information, and disconnected from the external apparatus when the measuring unit measures the first correction information.

11. The disk apparatus according to claim 6, wherein
the output unit is connected to the external apparatus when the outputting the first correction information measured by the measuring unit to the external apparatus.

12. The disk apparatus according to claim 1, wherein
the first correction information and the second correction information include a component that is mutually different between the tracks, obtained by eliminating a component that is common between the tracks.

13. The disk apparatus according to claim 1, wherein
each of the first correction information and the second correction information is used for correcting the distortion synchronized with the rotation frequency of the servo information by following a distortion on a track.

14. The disk apparatus according to claim 1, wherein
each of the first correction information and the second correction information is used for correcting the distortion synchronized with the rotation frequency of the servo information by following a virtual track, without following a distortion on a track.

15. An information processing system comprising:
a disk apparatus having a first disk on which servo information is formed, wherein
the disk apparatus includes
   a storing unit that stores first correction information for correcting a distortion synchronized with a rotation frequency of the servo information, the first correction information being measured based on the servo information of the first disk; and
   a control unit that controls positioning of a head on a target track by correcting the servo information of the first disk with the first correction information stored in the storing unit, and
measurement information that is used for measuring the first correction information is calculated based on second correction information for correcting a distortion synchronized with the rotation frequency of the servo information in other disk apparatus including a second disk on which the servo information is formed using a common master medium with the first disk.

16. An information providing apparatus comprising:
a storing unit that stores information for correcting a distortion synchronized with a rotation frequency of servo information in a second disk apparatus including a second disk on which the servo information is formed, as second correction information; and
a transmitting unit that transmits, when a first disk apparatus including a first disk on which the servo information is formed using a common master medium with the second disk measures information for correcting a distortion synchronized with the rotation frequency of the servo information, as first correction information, information calculated based on the second correction information to the first disk apparatus as measurement information.

17. The information providing apparatus according to claim 16, wherein
a plurality of second disk apparatuses is provided, and
the information providing apparatus further comprises a calculating unit that calculates the measurement information, using a plurality of pieces of second correction information measured by the second disk apparatuses and stored in the storing unit.

18. The information providing apparatuses according to claim 16, further comprising:
a receiving unit that receives the first correction information from the first disk apparatus, wherein
the storing unit stores the first correction information received by the receiving unit together with the second correction information.

19. The information providing apparatus according to claim 17, wherein
the second correction information is measured for each track of the second disk, and
the transmitting unit transmits the measurement information calculated by the calculating unit for each track to the first disk apparatus.

20. The information providing apparatus according to claim 16, wherein
the transmitting unit transmits the measurement information for a track corresponding to the first correction information measured by the first disk apparatus to the first disk apparatus each time the first disk apparatus measures the first correction information.

21. The information providing apparatus according to claim 16, wherein
the transmitting unit collectively transmits a plurality of pieces of measurement information for tracks corresponding to the first correction information measured by the first disk apparatus to the first disk apparatus.

22. The information providing apparatus according to claim 16, wherein
the transmitting unit is connected to the first disk apparatus when transmitting the measurement information, and disconnected from the first disk apparatus when the first disk apparatus measures the first correction information.

23. The information providing apparatus according to claim 18, wherein
the receiving unit is connected to the first disk apparatus when receiving the first correction information from the first disk apparatus.

24. A disk-apparatus correcting system that causes a first disk apparatus including a first disk on which servo information is formed to measure information for correcting a distortion synchronized with a rotation frequency of the servo information as first correction information, the disk-apparatus correcting system comprising:
  a storing unit that stores information for correcting a distortion synchronized with the rotation frequency of the servo information of a second disk apparatus including a second disk on which the servo information is formed using a common master medium with the first disk, as second correction information in advance, wherein
  the first disk apparatus uses information calculated based on the second correction information stored in the storing unit, as measurement information when measuring the first correction information.

25. The disk-apparatus correcting system according to claim 24, wherein
  the first disk apparatus sets the measurement information as an initial correction value when measuring the first correction information.

26. The disk-apparatus correcting system according to claim 24, wherein
  a plurality of second disk apparatuses is provided,
  the disk-apparatus correcting system further comprises a calculating unit that calculates the measurement information using a plurality of pieces of second correction information stored in the storing unit, and
  the first disk apparatus uses the measurement information calculated by the calculating unit when measuring the first correction information.

27. The disk-apparatus correcting system according to claim 24, wherein
  the storing unit stores the first correction information measured by the first disk apparatus together with the second correction information.

28. A method of manufacturing a disk apparatus by writing servo information on a first disk and mounting the first disk on which the servo information is written into the disk apparatus, the method comprising:
  acquiring, from a second disk apparatus including a second disk on which the servo information is formed using a common master medium with the first disk, information for correcting a distortion synchronized with the rotation frequency of the servo information in the second disk apparatus, as second correction information;
  calculating, based on the second correction information, measurement information that is used by a first disk apparatus including the first disk when measuring the first correction information for correcting a distortion synchronized with the rotation frequency of the servo information in the first disk apparatus; and
  measuring including
    inputting the measurement information to the first disk apparatus; and
    causing the first disk apparatus to measure the first correction information.

29. The manufacturing method of disk apparatuses according to claim 28, wherein
  the measuring including setting the measurement information as an initial correction value when measuring the first correction information.

30. A control apparatus that controls positioning of a head on a track of a first disk on which servo information is formed, the control apparatus comprising:
  a storing unit that stores first correction information for correcting a distortion synchronized with a rotation frequency of the servo information, the first correction information being measured based on the servo information of the first disk; and
  a control unit that controls the positioning of the head on a target track by correcting the servo information of the first disk with the first correction information stored in the storing unit, wherein
  measurement information that is used for measuring the first correction information is calculated based on second correction information for correcting a distortion synchronized with the rotation frequency of the servo information in other disk apparatus including a second disk on which the servo information is formed using a common master medium with the first disk.

* * * * *